(12) United States Patent
Manolakos et al.

(10) Patent No.: US 11,310,022 B2
(45) Date of Patent: Apr. 19, 2022

(54) DEMODULATION REFERENCE SIGNAL BUNDLING

(71) Applicant: QUALCOMM Incorporated, San Diego, CA (US)

(72) Inventors: Alexandros Manolakos, San Diego, CA (US); Joseph Binamira Soriaga, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 16/884,936

(22) Filed: May 27, 2020

(65) Prior Publication Data

US 2020/0403768 A1 Dec. 24, 2020

(30) Foreign Application Priority Data

Jun. 20, 2019 (GR) .............................. 20190100270

(51) Int. Cl.
*H04L 5/10* (2006.01)
*H04L 5/00* (2006.01)
(Continued)

(52) U.S. Cl.
CPC .............. *H04L 5/10* (2013.01); *H04L 5/0051* (2013.01); *H04L 5/0082* (2013.01);
(Continued)

(58) Field of Classification Search
CPC ....... H04L 5/10; H04L 5/0051; H04L 5/0082; H04W 72/0446; H04W 72/0453; H04W 72/1263; H04W 72/14
See application file for complete search history.

(56) References Cited

U.S. PATENT DOCUMENTS

2013/0294333 A1* 11/2013 Chen ..................... H04W 28/06
370/328
2015/0155993 A1* 6/2015 Berggren .............. H04L 5/0023
370/330
(Continued)

FOREIGN PATENT DOCUMENTS

WO       2017136079 A1    8/2017
WO       WO20170136079   * 8/2017

OTHER PUBLICATIONS

International Search Report and Written Opinion—PCT/US2020/034821—ISAEPO—dated Sep. 7, 2020.
(Continued)

*Primary Examiner* — Jeffrey M Rutkowski
*Assistant Examiner* — Chae S Lee
(74) *Attorney, Agent, or Firm* — Harrity & Harrity LLP

(57) ABSTRACT

Various aspects of the present disclosure generally relate to wireless communication. In some aspects, a receiver may receive an indication that a plurality of time-domain resources are associated for purposes of demodulation reference signal (DMRS) bundling of a physical channel. The receiver may determine, based at least in part on receiving the indication, a first DMRS pattern for a first subset of time-domain resources of the plurality of time-domain resources of the physical channel, and a second DMRS pattern for a second subset of time-domain resources of the plurality of time-domain resources of the physical channel, the first DMRS pattern and the second DMRS pattern being different DMRS patterns. Numerous other aspects are provided.

30 Claims, 17 Drawing Sheets

(51) Int. Cl.
*H04W 72/04* (2009.01)
*H04W 72/12* (2009.01)
*H04W 72/14* (2009.01)

(52) U.S. Cl.
CPC ... *H04W 72/0446* (2013.01); *H04W 72/0453* (2013.01); *H04W 72/1263* (2013.01); *H04W 72/14* (2013.01)

(56) References Cited

U.S. PATENT DOCUMENTS

| | | |
|---|---|---|
| 2019/0159181 A1 | 5/2019 | Manolakos et al. |
| 2020/0145924 A1* | 5/2020 | Tang .................. H04W 52/0235 |
| 2020/0213978 A1* | 7/2020 | Iyer ....................... H04L 1/1812 |
| 2021/0195619 A1* | 6/2021 | Schober .............. H04W 72/082 |

OTHER PUBLICATIONS

Samsung: "Remaining Issues on PRB Bundling", 3GPP Draft, 3GPP TSG RAN WG1 Meeting #93, R1-1806711 Remaining Issues on PRB Bundling_R1, 3rd Generation Partnership Project (3GPP), Mobile Competence Centre, 650, Route Des Lucioles, F-06921 Sophia-Antipolis Cedex, France, vol. RAN WG1, No. Busan, Korea, May 21-25, 2018, May 20, 2018 (May 20, 2018), XP051441913, 3 Pages, Retrieved from the Internet: URL: http://www.3gpp.org/ftp/Meetings%5F3GPP%5FSYNC/RAN1/Docs/, [retrieved on May 20, 2018], Section 2.

* cited by examiner

Quantity of DMRS Transmissions In Non-Edge Resources
Based At Least In Part on An Offset From AdditionalPosition

FIGURE 5G

DEMODULATION REFERENCE SIGNAL BUNDLING

CROSS-REFERENCE TO RELATED APPLICATION

This application claims priority to Greece Application No. 20190100270, filed on Jun. 20, 2019, entitled "DEMODULATION REFERENCE SIGNAL BUNDLING," which is hereby expressly incorporated by reference herein.

FIELD OF THE DISCLOSURE

Aspects of the present disclosure generally relate to wireless communication and to techniques and apparatuses for demodulation reference signal bundling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, or the like, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In some cases, a transmitter, such as a UE or a BS, may transmit one or more demodulation reference signals (DMRSs) to a receiver, such as another UE or BS, which the receiver may use to perform a channel estimation to facilitate demodulation of communications received from the transmitter. In some cases, the transmitter may associate or bundle a plurality of time-domain resources for purposes of DMRS bundling, in which case the receiver may assume that the same precoder is used across the plurality of time-domain resources and that DMRS transmissions across the plurality of time-domain resources may be coherently filtered to increase the accuracy of the channel estimation. However, if the receiver is unaware that the plurality of time-domain resources are associated or bundled for purposes of DMRS bundling or is unaware of the DMRS bundling configuration, the receiver may be unable to identify or locate the DMRS transmissions across the plurality of time-domain resources. As a result, the receiver may be unable to perform a channel estimation or may perform an inaccurate channel estimation, which may result in decreased demodulation performance.

SUMMARY

In some aspects, a method of wireless communication, performed by a receiver, may include receiving an indication that a plurality of time-domain resources are associated for purposes of demodulation reference signal (DMRS) bundling of a physical channel; and determining, based at least in part on receiving the indication, a first DMRS pattern for a first subset of time-domain resources of the plurality of time-domain resources of the physical channel, and a second DMRS pattern for a second subset of time-domain resources of the plurality of time-domain resources of the physical channel, the first DMRS pattern and the second DMRS pattern being different DMRS patterns.

In some aspects, a method of wireless communication, performed by a transmitter, may include transmitting an indication that a plurality of time-domain resources are associated for purposes of DMRS bundling of a physical channel; transmitting, based at least in part on a first DMRS pattern, a plurality of first DMRS transmissions in a first subset of time-domain resources of the plurality of time-domain resources of the physical channel; and transmitting, based at least in part on a second DMRS pattern, one or more second DMRS transmissions in a second subset of time-domain resources of the plurality of time-domain resources of the physical channel, the first DMRS pattern and the second DMRS pattern being different DMRS patterns.

In some aspects, a receiver for wireless communication may include memory and one or more processors operatively coupled to the memory. The memory and the one or more processors may be configured to receive an indication that a plurality of time-domain resources are associated for purposes of DMRS bundling of a physical channel; and determine, based at least in part on receiving the indication, a first DMRS pattern for a first subset of time-domain resources of the plurality of time-domain resources of the physical channel, and a second DMRS pattern for a second subset of time-domain resources of the plurality of time-domain resources of the physical channel, the first DMRS pattern and the second DMRS pattern being different DMRS patterns.

In some aspects, a transmitter for wireless communication may include memory and one or more processors operatively coupled to the memory. The memory and the one or more processors may be configured to transmit an indication that a plurality of time-domain resources are associated for purposes of DMRS bundling of a physical channel; transmit, based at least in part on a first DMRS pattern, a plurality of first DMRS transmissions in a first subset of time-domain resources of the plurality of time-domain resources of the physical channel; and transmit, based at least in part on a second DMRS pattern, one or more second DMRS transmissions in a second subset of time-domain resources of the plurality of time-domain resources of the physical channel, the first DMRS pattern and the second DMRS pattern being different DMRS patterns.

In some aspects, a non-transitory computer-readable medium may store one or more instructions for wireless communication. The one or more instructions, when executed by one or more processors of a receiver, may cause the one or more processors to receive an indication that a plurality of time-domain resources are associated for purposes of DMRS bundling of a physical channel; and determine, based at least in part on receiving the indication, a first DMRS pattern for a first subset of time-domain resources of the plurality of time-domain resources of the physical channel, and a second DMRS pattern for a second subset of time-domain resources of the plurality of time-domain resources of the physical channel, the first DMRS pattern and the second DMRS pattern being different DMRS patterns.

In some aspects, a non-transitory computer-readable medium may store one or more instructions for wireless communication. The one or more instructions, when executed by one or more processors of a transmitter, may cause the one or more processors to transmit an indication that a plurality of time-domain resources are associated for purposes of DMRS bundling of a physical channel; transmit, based at least in part on a first DMRS pattern, a plurality of first DMRS transmissions in a first subset of time-domain resources of the plurality of time-domain resources of the physical channel; and transmit, based at least in part on a second DMRS pattern, one or more second DMRS transmissions in a second subset of time-domain resources of the plurality of time-domain resources of the physical channel, the first DMRS pattern and the second DMRS pattern being different DMRS patterns.

In some aspects, an apparatus for wireless communication may include means for receiving an indication that a plurality of time-domain resources are associated for purposes of DMRS bundling of a physical channel; and means for determining, based at least in part on receiving the indication, a first DMRS pattern for a first subset of time-domain resources of the plurality of time-domain resources of the physical channel, and a second DMRS pattern for a second subset of time-domain resources of the plurality of time-domain resources of the physical channel, the first DMRS pattern and the second DMRS pattern being different DMRS patterns.

In some aspects, an apparatus for wireless communication may include means for transmitting an indication that a plurality of time-domain resources are associated for purposes of DMRS bundling of a physical channel; means for transmitting, based at least in part on a first DMRS pattern, a plurality of first DMRS transmissions in a first subset of time-domain resources of the plurality of time-domain resources of the physical channel; and means for transmitting, based at least in part on a second DMRS pattern, one or more second DMRS transmissions in a second subset of time-domain resources of the plurality of time-domain resources of the physical channel, the first DMRS pattern and the second DMRS pattern being different DMRS patterns.

Aspects generally include a method, apparatus, system, computer program product, non-transitory computer-readable medium, user equipment, base station, wireless communication device, and processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIGS. 5A-5H are diagrams illustrating examples of demodulation reference signal (DMRS) bundling in accordance with various aspects of the present disclosure.

DETAILED DESCRIPTION

Figure 1:
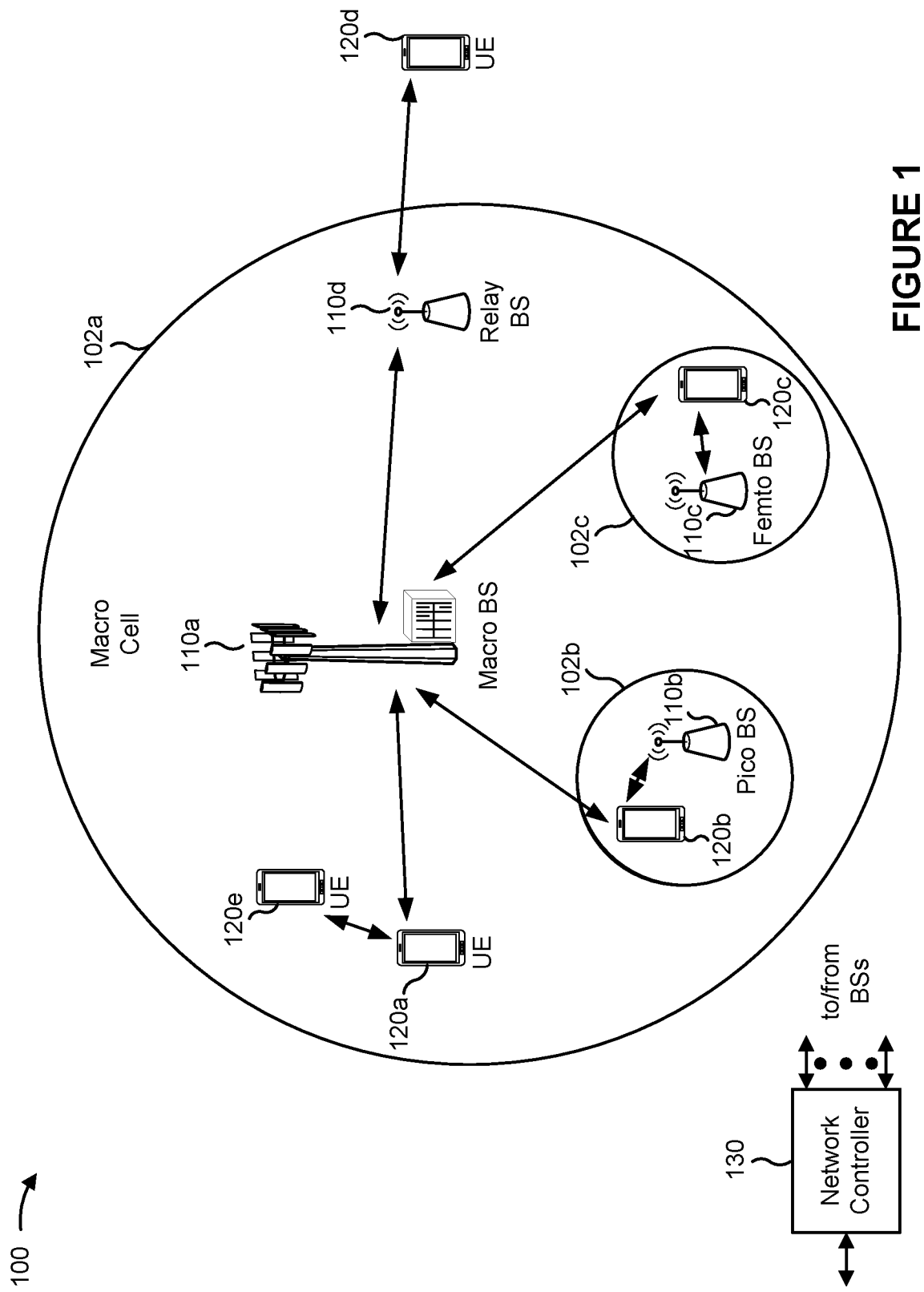
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like, or combinations thereof (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G or 4G wireless technologies, aspects of the present disclosure can be applied in other generation-based communication systems, such as 5G and later, including NR technologies.

In some cases, a transmitter, such as a user equipment (UE) or a base station (BS), may transmit one or more demodulation reference signals (DMRSs) to a receiver such as another UE or BS. A DMRS may include a reference signal that is generated from a base sequence, such as a Zadoff-Chu sequence or a Gold sequence. The receiver may perform one or more measurements of the DMRS to estimate a physical channel on which one or more communications are transmitted from the transmitter. In this way, the UE may determine whether a channel quality of the physical channel satisfies one or more channel quality thresholds, and may use the results from the one or more measurements to facilitate demodulation of the communications transmitted on the physical channel.

In some cases, the transmitter may associate or bundle a plurality of time-domain resources for purposes of DMRS bundling, in which case the receiver may assume that the same precoder is used across the plurality of time-domain resources and that DMRS transmissions across the plurality of time-domain resources may be coherently filtered to increase the accuracy of the channel estimation. However, if the receiver is unaware that the plurality of time-domain resources are associated or bundled for purposes of DMRS bundling or is unaware of the DMRS bundling configuration, the receiver may be unable to identify or locate the DMRS transmissions across the plurality of time-domain resources. As a result, the receiver may be unable to perform a channel estimation or may perform an inaccurate channel estimation, which may result in decreased demodulation performance.

Various aspects relate generally to DMRS bundling. In some aspects described herein, a transmitter may transmit, to a receiver, an indication that a plurality of time-domain resources are associated for purposes of DMRS bundling. In some aspects, the transmitter may further transmit an indication of a DMRS bundling configuration for the plurality of time-domain resources, or the receiver may be hard coded with the DMRS bundling configuration.

Particular aspects of the subject matter described in this disclosure can be implemented to realize one or more of the following potential advantages. In some examples, the described techniques may permit the receiver to determine DMRS patterns of DMRS transmissions for the plurality of time-domain resources based at least in part on the indication that the plurality of time-domain resources are associated for purposes of DMRS bundling and the DMRS bundling configuration. This permits the receiver to identify the DMRS transmissions, to perform a channel estimation of a physical channel on which the transmitter is to transmit one or more communications, and to use the channel estimation to facilitate demodulation of the one or more communications.

FIG. 1 is a block diagram illustrating an example wireless network 100 in accordance with various aspects of the present disclosure. The wireless network 100 may be a Long Term Evolution (LTE) network or some other wireless network, such as a 5G or NR network. The wireless network 100 may include a quantity of BSs 110 (shown as BS 110a, BS 110b, BS 110c, and BS 110d) and other network entities. A BS is an entity that communicates with UE(s) and may also be referred to as a Node B, an eNodeB, an eNB, a gNB, a NR BS, a 5G node B (NB), an access point (AP), a transmit receive point (TRP), or the like, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

Wireless network 100 may be a heterogeneous network that includes BSs of different types, for example, macro BSs, pico BSs, femto BSs, relay BSs, or the like, or combinations thereof. These different types of BSs may have different transmit power levels, different coverage areas, and different impacts on interference in wireless network 100. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network 100 through various types of backhaul interfaces such as a direct physical connection, a virtual network, or the like, or combinations thereof using any suitable transport network.

Wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, or the like, or combinations thereof.

UEs 120 (for example, 120*a*, 120*b*, 120*c*) may be dispersed throughout wireless network 100, and each UE may be stationary or mobile. A UE may also be referred to as an access terminal, a terminal, a mobile station, a subscriber unit, a station, or the like, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or the like, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, or the like, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier or the like, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, among other possibilities/examples), a mesh network, among other possibilities/examples. In such examples, the UE 120 may perform scheduling operations, resource selection operations, or other operations described elsewhere herein as being performed by the base station 110.

Figure 2:
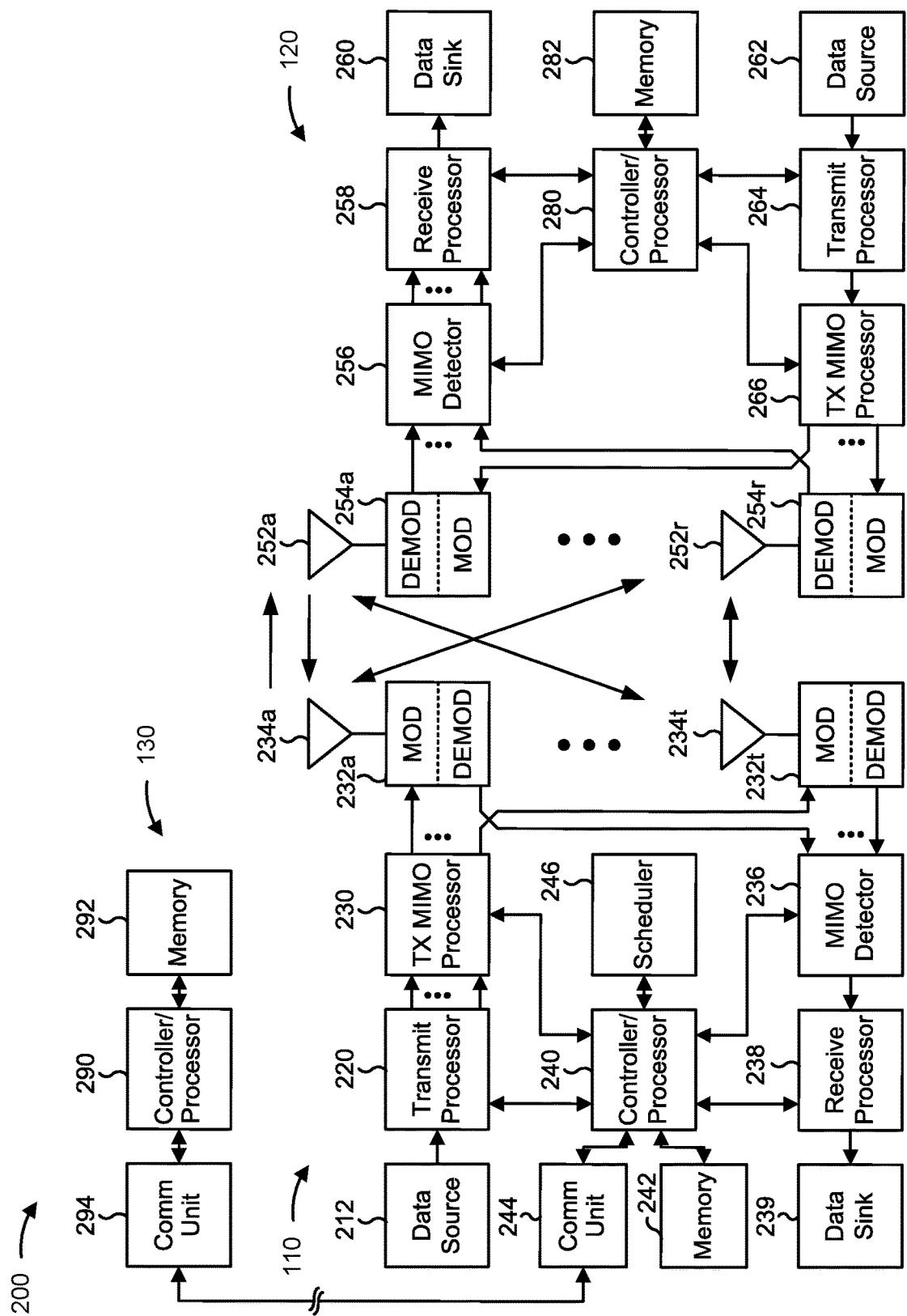
FIG. 2 is a block diagram illustrating an example base station (BS) in communication with a user equipment (UE) in a wireless network in accordance with various aspects of the present disclosure.

FIG. 2 is a block diagram 200 illustrating an example base station (BS) in communication with a user equipment (UE) in a wireless network in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other possibilities/examples) and control information (for example, CQI requests, grants, upper layer signaling, among other possibilities/examples) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232*a* through 232*t*. Each MOD 232 may process a respective output symbol stream (for example, for OFDM among other possibilities/examples) to obtain an output sample stream. Each MOD 232 may further process (for example, convert to analog, amplify, filter, and upconvert) the output sample stream to obtain a downlink signal. T downlink signals from MODs 232*a* through 232*t* may be transmitted via T antennas 234*a* through 234*t*, respectively. In accordance with various aspects described in more detail below, the synchronization signals can be generated with location encoding to convey additional information.

At UE 120, antennas 252*a* through 252*r* may receive the downlink signals from base station 110 or other base stations and may provide received signals to R demodulators (DE-MODs) 254*a* through 254*r*, respectively. Each DEMOD 254 may condition (for example, filter, amplify, downconvert, and digitize) a received signal to obtain input samples. Each DEMOD 254 may further process the input samples (for example, for OFDM among other possibilities/examples) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), among other possibilities/examples. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, among other possibilities/examples) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), orthogonal frequency division multiplexing (OFDM) with a cyclic prefix (CP) (CP-OFDM), among other possibilities/examples), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with DMRS bundling, as described in more detail elsewhere herein. For example, controller/processor 240 of base station 110, controller/processor 280 of UE 120, or any other component(s) of FIG. 2 may perform or direct operations of, for example, process 600 of FIG. 6, process 700 of FIG. 7, or other processes as described herein. Memories 242 and 282 may store data and program codes for base station 110 and UE 120, respectively. A scheduler 246 may schedule UEs for data transmission on the downlink or uplink.

In some aspects, a receiver (such as BS 110 or UE 120) may include means for receiving an indication that a plurality of time-domain resources are associated for purposes of DMRS bundling of a physical channel, means for determining, based at least in part on receiving the indication, a first DMRS pattern for a first subset of time-domain resources of the plurality of time-domain resources of the physical channel, and a second DMRS pattern for a second subset of time-domain resources of the plurality of time-domain resources of the physical channel, the first DMRS pattern and the second DMRS pattern being different DMRS patterns, among other possibilities/examples. In some aspects, such means may include one or more components of BS 110 or UE 120 described in connection with FIG. 2.

In some aspects, a transmitter (such as BS 110 or UE 120) may include means for transmitting an indication that a plurality of time-domain resources are associated for purposes of DMRS bundling of a physical channel, means for transmitting, based at least in part on a first DMRS pattern, a plurality of first DMRS transmissions in a first subset of time-domain resources of the plurality of time-domain resources of the physical channel, means for transmitting, based at least in part on a second DMRS pattern, one or more second DMRS transmissions in a second subset of time-domain resources of the plurality of time-domain resources of the physical channel, the first DMRS pattern and the second DMRS pattern being different DMRS patterns, among other possibilities/examples. In some aspects, such means may include one or more components of BS 110 or UE 120 described in connection with FIG. 2.

Figure 3A:
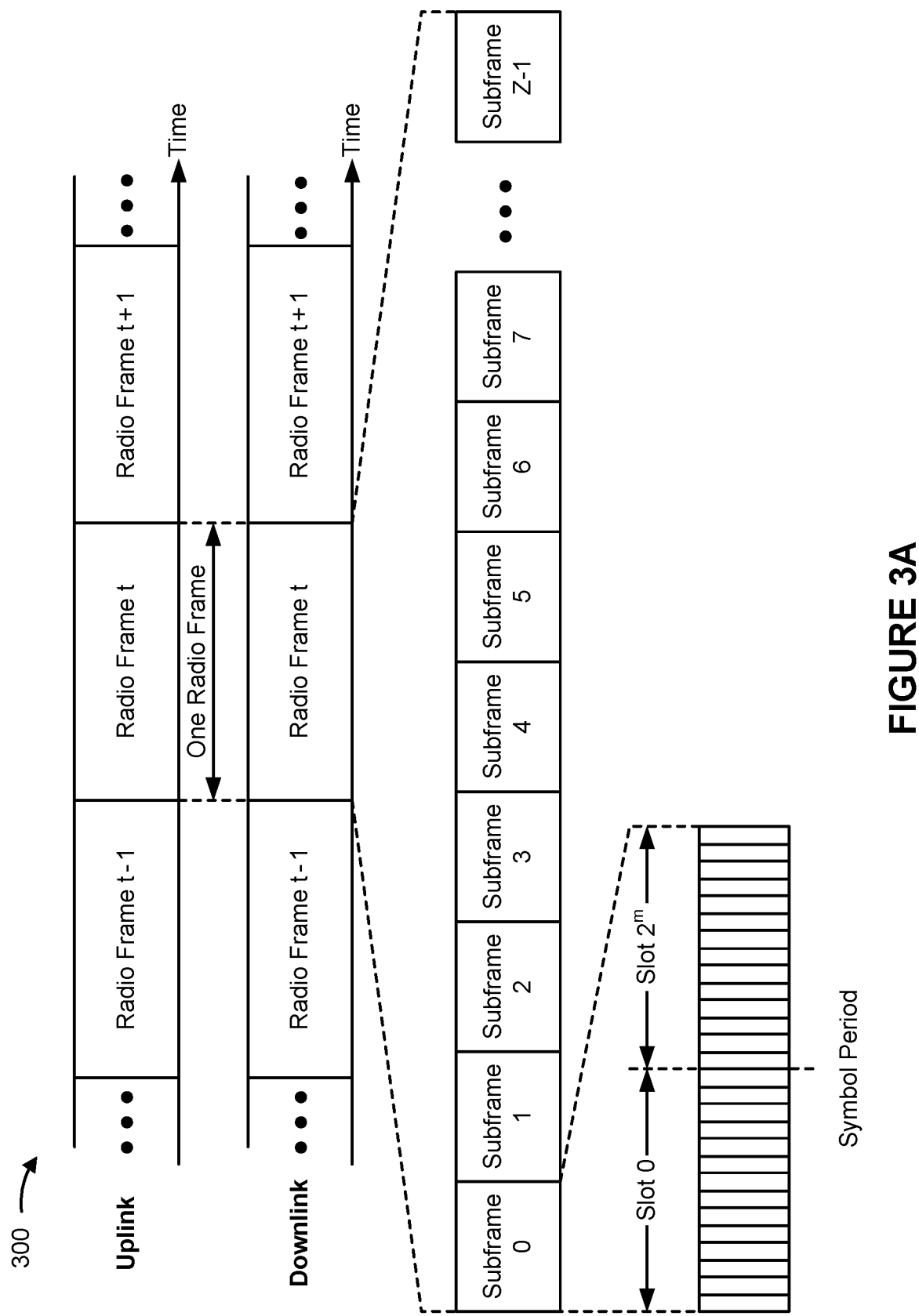
FIG. 3A is a block diagram illustrating an example frame structure for use in a wireless network in accordance with various aspects of the present disclosure.

FIG. 3A is a block diagram illustrating an example frame structure 300 for use in a wireless network in accordance with various aspects of the present disclosure. For example, frame structure 300 may be used for frequency division duplexing (FDD) in a telecommunications system (for example, NR). The transmission timeline for each of the downlink and uplink directions may be partitioned into units of radio frames (sometimes referred to simply as "frames"). Each radio frame may have a predetermined duration (for example, 10 milliseconds (ms)) and may be partitioned into a set of Z ($Z \geq 1$) subframes (for example, with indices of 0 through Z−1). Each subframe may have a predetermined duration (for example, 1 ms) and may include a set of slots (for example, $2^m$ slots per subframe are shown in FIG. 3A, where m is numerology used for a transmission, such as 0, 1, 2, 3, 4, among other possibilities/examples). Each slot may include a set of L symbol periods. For example, each slot may include fourteen symbol periods (for example, as shown in FIG. 3A), seven symbol periods, or another quantity of symbol periods. In a case where the subframe includes two slots (for example, when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, among other possibilities/examples.

While some techniques are described herein in connection with frames, subframes, slots, or the like, or combinations thereof, these techniques may equally apply to other types of wireless communication structures, which may be referred to using terms other than "frame," "subframe," "slot," or the like, or combinations thereof in 5G NR. In some aspects, a wireless communication structure may refer to a periodic time-bounded communication unit defined by a wireless communication standard or protocol. Additionally or alternatively, different configurations of wireless communication structures than those shown in FIG. 3A may be used.

In some telecommunications (for example, NR), a base station may transmit synchronization signals. For example, a base station may transmit a primary synchronization signal (PSS), a secondary synchronization signal (SSS), or the like, or combinations thereof, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, or the PBCH in accordance with a synchronization communication hierarchy (for example, a synchronization signal (SS) hierarchy) including multiple synchronization communications (for example, SS blocks), as described below in connection with FIG. 3B.

Figure 3B:
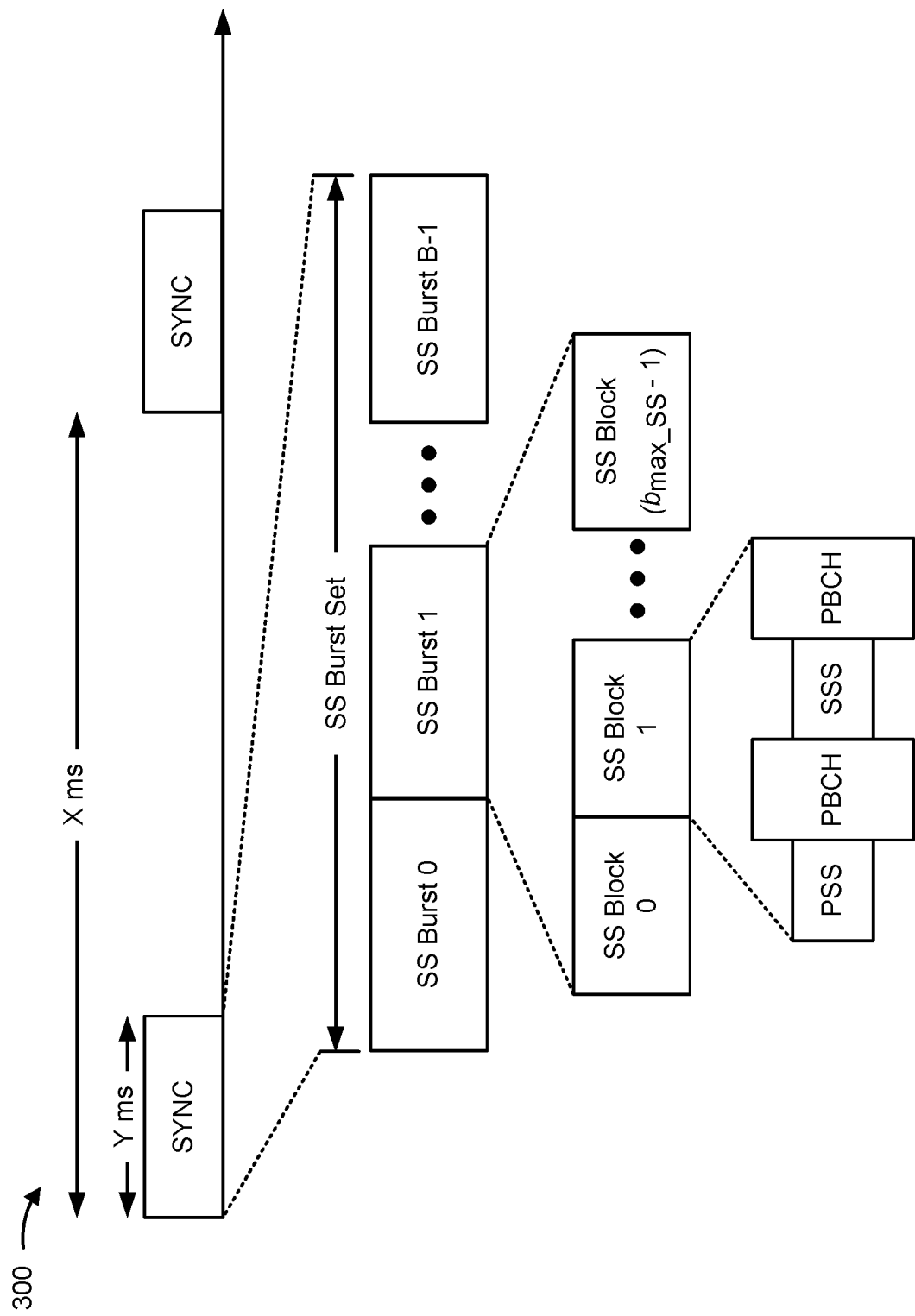
FIG. 3B is a block diagram illustrating an example synchronization communication hierarchy for use in a wireless communication network in accordance with various aspects of the present disclosure.

FIG. 3B is a block diagram illustrating an example synchronization communication hierarchy for use in a wireless communication network in accordance with various aspects of the present disclosure. The SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum quantity of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum quantity of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, or other synchronization signals (for example, a tertiary synchronization signal (TSS)) or synchronization channels. In some aspects, multiple SS blocks are included in an SS burst, and the PSS, the SSS, or the PBCH may be the same across each SS block of the SS burst. In some aspects, a single SS block may be included in an SS burst. In some aspects, the SS block may be at least four symbol periods in length, where each symbol carries one or more of the PSS (for example, occupying one symbol), the SSS (for example, occupying one symbol), or the PBCH (for example, occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (for example, consecutive symbol periods) during one or more slots. Additionally or alternatively, one or more SS blocks of the SS burst may be transmitted in non-consecutive radio resources.

In some aspects, the SS bursts may have a burst period during which the SS blocks of the SS burst are transmitted by the base station in accordance with the burst period. In other words, the SS blocks may be repeated during each SS burst. In some aspects, the SS burst set may have a burst set periodicity, and the SS bursts of the SS burst set are transmitted by the base station in accordance with the fixed burst set periodicity. In other words, the SS bursts may be repeated during each SS burst set.

The base station may transmit system information, such as system information blocks (SIBS) on a physical downlink shared channel (PDSCH) in some slots. The base station may transmit control information/data on a physical downlink control channel (PDCCH) in C symbol periods of a slot, where C may be configurable for each slot. The base station may transmit traffic data or other data on the PDSCH in the remaining symbol periods of each slot.

Figure 4:
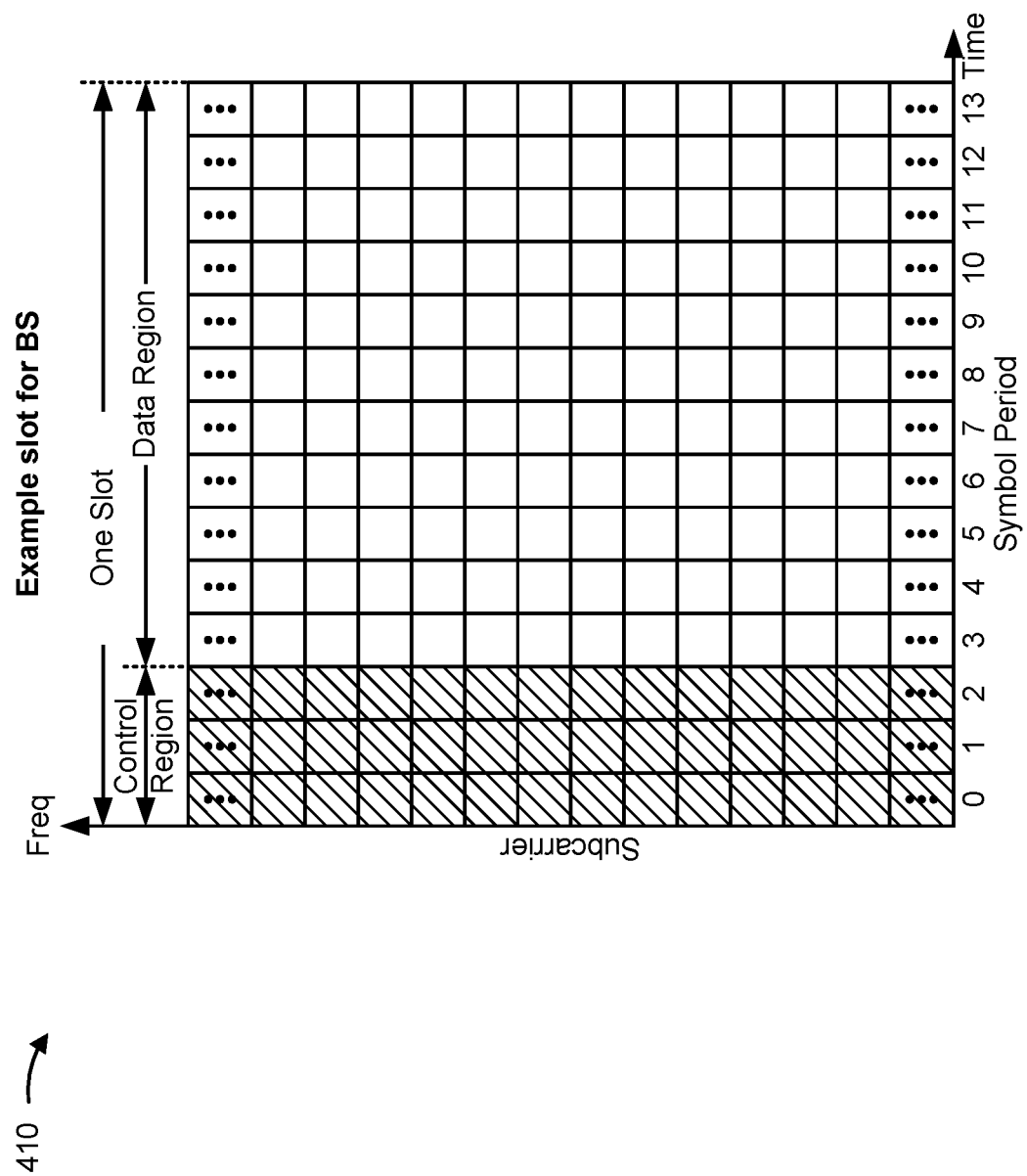
FIG. 4 is a block diagram illustrating an example slot format in accordance with various aspects of the present disclosure.

FIG. 4 is a block diagram 400 illustrating an example slot format 410 in accordance with various aspects of the present disclosure. The available time frequency resources may be partitioned into resource blocks. Each resource block may cover a set of subcarriers (for example, 12 subcarriers) in one slot and may include a quantity of resource elements. Each resource element may cover one subcarrier in one symbol period (for example, in time) and may be used to send one modulation symbol, which may be a real or complex value.

An interlace structure may be used for each of the downlink and uplink for FDD in some telecommunications systems (for example, NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, or the like, or combinations thereof. Received signal quality may be quantified by a signal-to-noise-and-interference ratio (SNIR), or a RSRQ, or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate in accordance with a new air interface (for example, other than Orthogonal Frequency Divisional Multiple Access (OFDMA)-based air interfaces) or fixed transport layer (for example, other than Internet Protocol (IP)). In aspects, NR may utilize OFDM with a cyclic prefix (CP) (herein referred to as cyclic prefix OFDM or CP-OFDM) or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) or DFT-s-OFDM on the uplink, may utilize CP-OFDM on the downlink and include support for half-duplex operation using TDD. NR may include Enhanced Mobile Broadband (eMBB) service targeting wide bandwidth (for example, 80 megahertz (MHz) and beyond), millimeter wave (mmW) targeting high carrier frequency (for example, 60 gigahertz (GHz)), massive MTC (mMTC) targeting non-backward compatible MTC techniques, or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (for example, downlink (DL) or uplink (UL)) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Aggregation of multiple cells may be supported with up to 8 serving cells. Alternatively, NR may support a different air interface, other than an OFDM-based interface. NR networks may include entities such central units or distributed units.

As indicated above, a transmitter, such as a UE or a BS, may transmit one or more DMRSs to a receiver such as another UE or BS. A DMRS may include a reference signal that is generated from a base sequence, such as a Zadoff-Chu sequence or a Gold sequence. The receiver may perform one or more measurements of the DMRS to estimate a physical channel on which one or more communications are transmitted from the transmitter. In this way, the UE may determine whether a channel quality of the physical channel satisfies one or more channel quality thresholds, and may use the results from the one or more measurements to facilitate demodulation of the communications transmitted on the physical channel.

In some cases, the transmitter may associate or bundle a plurality of time-domain resources for purposes of DMRS bundling, in which case the receiver may assume that the same precoder is used across the plurality of time-domain resources and that DMRS transmissions across the plurality of time-domain resources may be coherently filtered to increase the accuracy of the channel estimation. However, if the receiver is unaware that the plurality of time-domain resources are associated or bundled for purposes of DMRS bundling or is unaware of the DMRS bundling configuration, the receiver may be unable to identify or locate the DMRS transmissions across the plurality of time-domain resources. As a result, the receiver may be unable to perform a channel estimation or may perform an inaccurate channel estimation, which may result in decreased demodulation performance.

Some aspects described herein provide techniques and apparatuses for DMRS bundling. A transmitter may transmit, to a receiver, an indication that a plurality of time-domain resources are associated for purposes of DMRS bundling. In some aspects, the transmitter may further transmit an indication of a DMRS bundling configuration for the plurality of time-domain resources, or the receiver may be hard coded with the DMRS bundling configuration. In this way, the receiver may determine DMRS patterns of DMRS transmissions for the plurality of time-domain resources based at least in part on the indication that the plurality of time-domain resources are associated for purposes of DMRS bundling and the DMRS bundling configuration. This permits the receiver to identify the DMRS transmissions, to perform a channel estimation of a physical channel on which the transmitter is to transmit one or more communications, and to use the channel estimation to facilitate demodulation of the one or more communications.

FIGS. 5A-5H are diagrams 500 illustrating examples of DMRS bundling in accordance with various aspects of the present disclosure. As shown in FIGS. 5A-5H, the examples may include communication between a transmitter, such as a BS 110 or a UE 120, and a receiver such as a BS 110 or a UE 120. In some aspects, the transmitter and receiver may be included in a wireless network such as wireless network 100 or another wireless network. In some aspects, the transmitter and receiver may communicate using a frame structure, such as frame structure 300 illustrated in FIG. 3A or another frame structure, and a slot format such as slot format 410 illustrated in FIG. 4 or another slot format.

To facilitate demodulation of communications that are transmitted by the transmitter to the receiver, the transmitter may transmit a plurality of DMRSs to the receiver. The receiver may perform one or more measurements of the plurality of DMRSs to estimate a physical channel on which the communications are to be transmitted. In some aspects, the transmitter may associate or bundle time-domain resources for purposes of DMRS bundling. In such examples, the transmitter may transmit DMRSs according to different DMRS patterns in the plurality of time-domain resources such that some time-domain resources may include fewer DMRS transmissions than other time-domain resources. This reduces the DMRS signaling overhead by decreasing the quantity of DMRS transmissions in the plurality of time-domain resources while permitting the receiver to use coherent DMRS transmissions across subsets of time-domain resources for channel estimation.

Figure 5A:
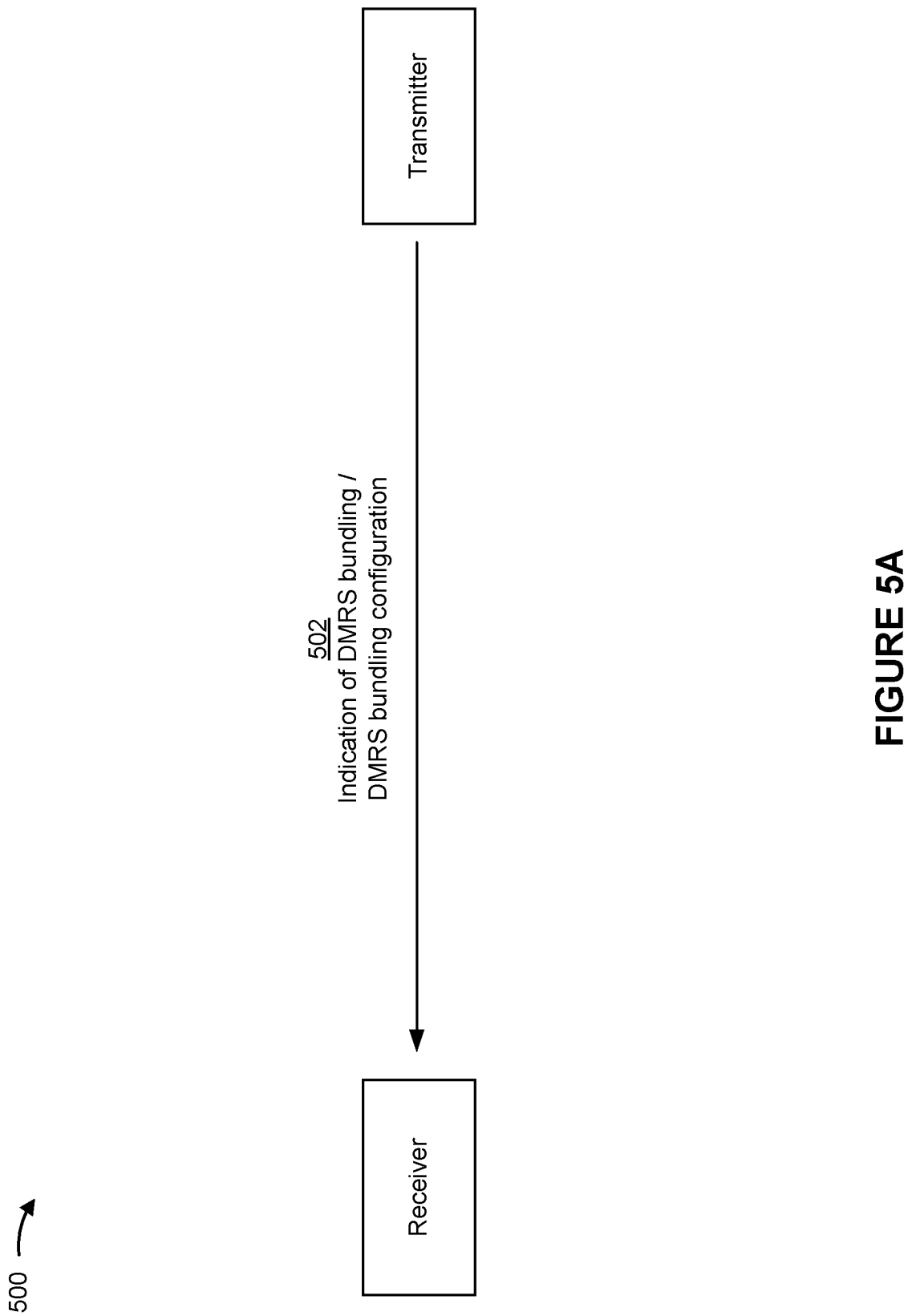

As shown in FIG. 5A, in a first operation 502, the transmitter may transmit an indication of DMRS bundling to the receiver such that the receiver is informed that a plurality of time-domain resources are associated for purposes of DMRS bundling. Moreover, the transmitter may transmit an indication of a DMRS bundling configuration for DMRS bundling in the plurality of time-domain resources. Alternatively, the receiver may be hard coded with the DMRS bundling configuration (that is, the receiver may be configured with the DMRS bundling configuration prior to being deployed in the wireless network).

In some aspects, the transmitter may transmit the indication of DMRS bundling and the indication of the DMRS bundling configuration in one or more signaling communications. The one or more signaling communications may include, for example, one or more master information blocks (MIBs), one or more SIBs, one or more PBCH communications, one or more PDCCH communications, one or more PDSCH communications, one or more physical uplink control channel (PUCCH) communications, one or more physical uplink shared channel (PUSCH) communications, one or more radio resource control (RRC) communications, one or more downlink control information (DCI) communications, one or more medium access control (MAC) control element (MAC-CE) communications, or the like, or a combination thereof. In some aspects, the receiver may transmit, to the transmitter, an indication that the receiver supports DMRS bundling. In such examples, the transmitter may transmit the indication of DMRS bundling and the indication of the DMRS bundling configuration based at least in part on receiving the indication that the receiver supports DMRS bundling.

In some aspects, the indication of DMRS bundling may include an indication of the plurality of time-domain resources and an indication that the plurality of time-domain resources are associated for purposes of DMRS bundling. Each time-domain resource of the plurality of time-domain resources may include a slot, a mini-slot, a portion of a slot (such as one or more OFDM symbols), a transmission time-interval (TTI), or a time-domain scheduling allocation, among other possibilities or examples. Accordingly, the plurality of time-domain resources may include a plurality of slots, a plurality of mini-slots, a plurality of portions of a slot (such as a plurality of OFDM symbols), a plurality of TTIs, a plurality of time-domain scheduling allocations, or a combination thereof, among other possibilities or examples. In some aspects, the indication of the plurality of time-domain resources may include a scheduling grant associated with the plurality of time-domain resources, may include an indication of a starting time-domain resource and an ending time-domain resource of a time-domain resource range that includes the plurality of time-domain resources, among other possibilities/examples.

The indication that the plurality of time-domain resources are associated for purposes of DMRS bundling may be an explicit indication or an implicit indication. An explicit indication that the plurality of time-domain resources are associated for purposes of DMRS bundling may include, for example, a value, a field, a flag, among other possibilities/examples, included in the one or more communications that indicate the plurality of time-domain resources are associated for purposes of DMRS bundling. In some aspects, an implicit indication that the plurality of time-domain resources are associated for purposes of DMRS bundling may include an indication that the plurality of time-domain resources are associated with the same scheduling grant or a set of consecutive scheduling grants. In some aspects, an implicit indication that the plurality of time-domain resources are associated for purposes of DMRS bundling may include an indication that the plurality of time-domain resources are associated with the same frequency-domain allocation (for example, that the plurality of time-domain resources span the same frequency-domain resources).

In some aspects, an implicit indication that the plurality of time-domain resources are associated for purposes of DMRS bundling may include an indication that the plurality of time-domain resources all have the same time-domain resource allocation length. For example, each time-domain resource allocation may span a full slot, or may span the same quantity of symbols of respective slots, among other possibilities/examples. In some aspects, an implicit indication that the plurality of time-domain resources are associated for purposes of DMRS bundling may include an indication that the plurality of time-domain resources are associated with the same physical channel mapping type, such as PDSCH Type A, PDSCH Type B, PUSCH Type A, or PUSCH Type B, among other possibilities/examples. The physical channel mapping type may indicate a location of a DMRS transmission and a scheduled resource (for example, a PUSCH or PDSCH resource) in a particular slot. A Type A mapping may indicate, for example, that a location of a front-loaded DMRS (the first DMRS in a particular slot or another type of time-domain resource) is based at least in part on a quantity of symbols between the first symbol of the slot and a last symbol of the scheduled resource. A Type B mapping may indicate, for example, that a location of a front-loaded DMRS is based at least in part on a first symbol and a last symbol of the scheduled resource.

The DMRS bundling configuration may include an indication of one or more DMRS bundling parameters for determining the DMRS patterns associated with each time-domain resource of the plurality of time-domain resources. A DMRS pattern associated with a particular time-domain resource may include the locations of DMRS transmissions in the time-domain resource, or the quantity of DMRS transmissions in the time-domain resource, among other possibilities/examples.

Figure 5B:
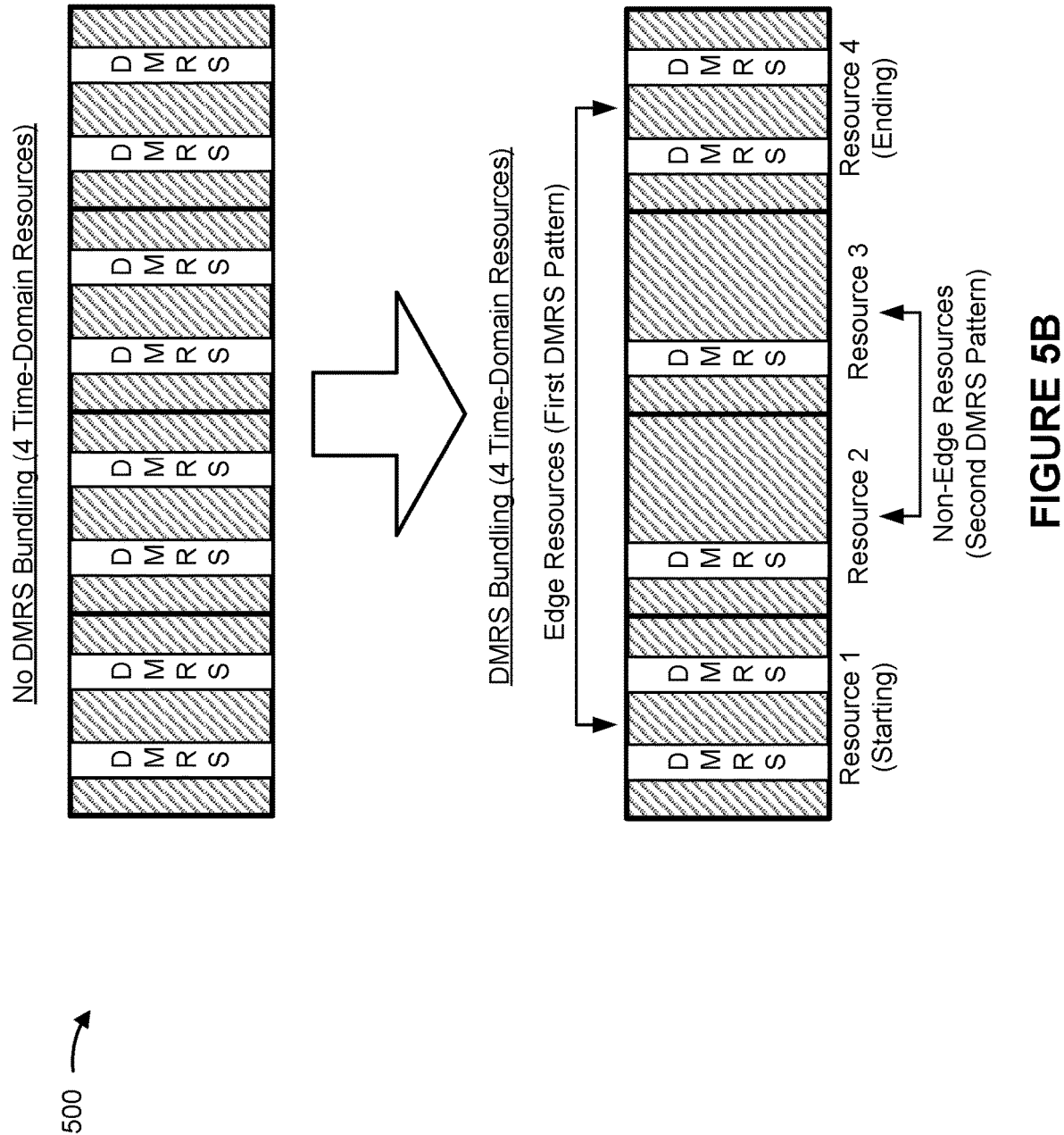
Figure 5C:
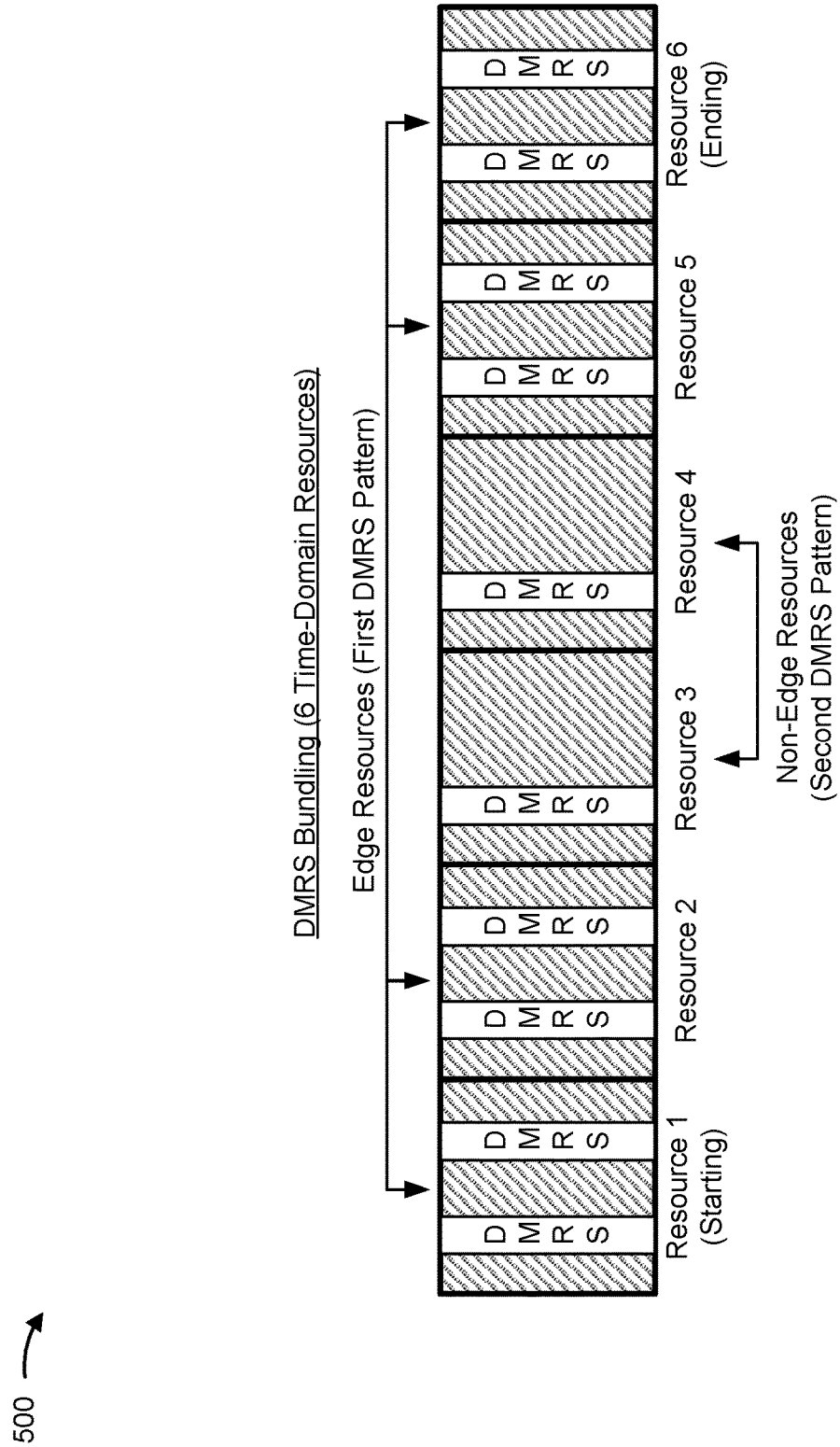

As shown in FIGS. 5B and 5C, the one or more DMRS bundling parameters may include an edge resource parameter that indicates or specifies a quantity of edge resources for purposes of DMRS bundling. An edge resource may include a time-domain resource at or near the beginning or end of the plurality of time-domain resources. As shown in FIG. 5B, for example, the edge resource parameter may indicate that the starting resource and the ending resource of the plurality of time-domain resources are edge resources. Accordingly, Resource 1 and Resource 4 of the example plurality of time-domain resources illustrated in FIG. 5B (Resources 1-4) may be edge resources. As shown in FIG. 5C, as another example, the edge resource parameter may indicate that the first two resources and the last two resources of the plurality of time-domain resources are edge resources. Accordingly, Resources 1, 2, 5, and 6 of the example plurality of time-domain resources illustrated in FIG. 5C (Resources 1-6) may be edge resources.

In some aspects, the edge resource parameter may explicitly indicate the edge resources for a particular plurality of time-domain resources. In some aspects, the edge resource parameter may indicate one or more rules for the receiver to determine the quantity of edge resources for a particular plurality of time-domain resources. For example, the edge resource parameter may indicate that the quantity of edge resources for a plurality of time-domain resources is based at least in part on a quantity of time-domain resources included in the plurality of time-domain resources. As an example, the edge resource parameter may indicate that, for quantities of time-domain resources less than six time-domain resources, the first time-domain resource and the last time-domain resource of a plurality of time-domain resources are edge resources. As another example, the edge resource parameter may indicate that, for quantities of time-domain resources greater than or equal to six time-domain resources, the first two time-domain resources and the last two time-domain resources of a plurality of time-domain resources are edge resources.

In some aspects, the one or more DMRS bundling parameters may include a DMRS pattern parameter that indicates which DMRS pattern is associated with edge resources of the plurality of time-domain resources and which DMRS pattern is associated with non-edge resources of the plurality of time-domain resources. For example, as shown in FIG. 5B, the DMRS pattern parameter may indicate that a first DMRS pattern is to be used in the edge resources and that a second DMRS pattern is to be used in non-edge resources. In some aspects, the first DMRS pattern may be different from the second DMRS pattern. In some aspects, the second DMRS pattern may be a subset of the first DMRS pattern in that the second DMRS pattern includes DMRS transmissions in same time-domain and frequency-domain locations, except that the second DMRS pattern includes fewer DMRS transmissions relative to the first DMRS pattern. For example, as shown in FIG. 5B, Resource 1 may include two DMRS transmissions whereas Resource 2 includes one DMRS transmission (the front-loaded DMRS transmission). In such examples, the DMRS transmission may occur at the same time-domain location (for example, the same symbol) in Resource 2 as the first DMRS transmission in Resource 1.

Figure 5D:
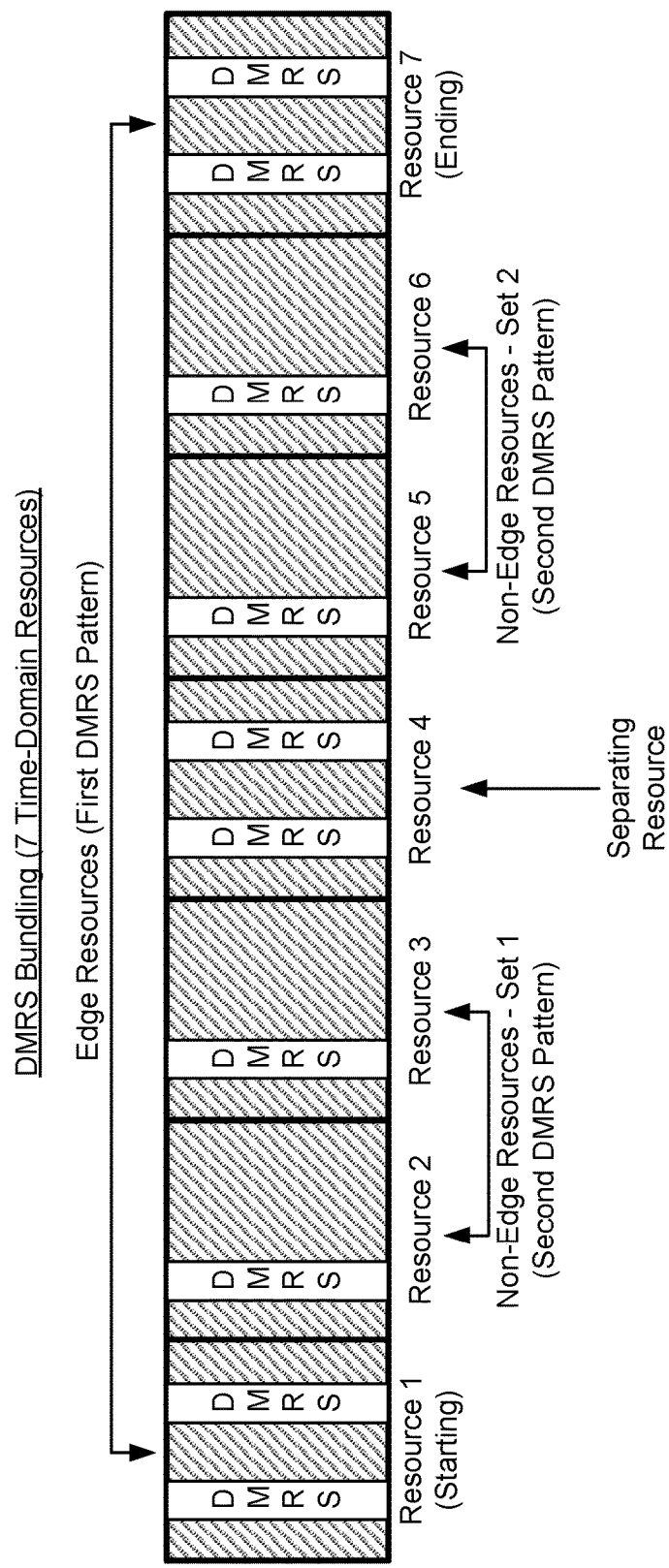

In some aspects, the receiver may determine the quantities and locations of non-edge resources in a plurality of time-domain resources based at least in part on the locations and quantities of edge resources for the plurality of time-domain resources. In some aspects, the one or more DMRS bundling parameters may include a non-edge resource parameter that indicates or specifies the non-edge resources. In such examples, the non-edge resources may include all or a subset of time-domain resources, included in the plurality of time-domain resources, between the edge resources. FIG. 5D illustrates an example in which the non-edge resources of a plurality of time-domain resources (Resources 1-7) are a subset of time-domain resources between the edge resources (Resource 1 and Resource 7) of the plurality of time-domain resources. As shown in FIG. 5D, the non-edge resources may include a plurality of sets of non-edge resources that are spaced apart by one or more separating resources. In some aspects, a first DMRS pattern may be used in the edge resources and the one or more separating resources. Each set of non-edge resources may include one or more non-edge resources in which a second DMRS pattern may be used. In some aspects, a third DMRS pattern, that is different from the first DMRS pattern and the second DMRS pattern, may be used in the one or more separating resources.

In some aspects, the non-edge resource parameter may explicitly indicate the locations of the sets of non-edge resources and the quantities of time-domain resources included in each set of non-edge resources. In such examples, the non-edge resource parameter may specify which resources (for example, Resources 2, 3, 5, and 6) are non-edge resources. In some aspects, the non-edge resource parameter may implicitly indicate the locations of the sets of non-edge resources and the quantities of time-domain resources included in each set of non-edge resources. In such examples, the non-edge resource parameter may specify a maximum quantity of time-domain resources that is permitted for a set of non-edge resources. For example, the non-edge resource parameter may specify a maximum quantity of time-domain resources of four, in which case a separating resource is to be included between sets of four non-edge resources.

In some aspects, the one or more DMRS bundling parameters may include one or more parameters associated with the second DMRS pattern (that is, the DMRS pattern that is to be used in non-edge resources). For example, if the second DMRS pattern is a subset of the first DMRS pattern except that the second DMRS pattern includes fewer DMRS transmissions relative to the first DMRS pattern, the one or more parameters associated with the second DMRS pattern may include a DMRS location parameter that indicates or specifies whether the locations of the one or more DMRS transmissions of the second DMRS pattern are affected by DMRS bundling associated with the plurality of time-domain resources.

Figure 5E:
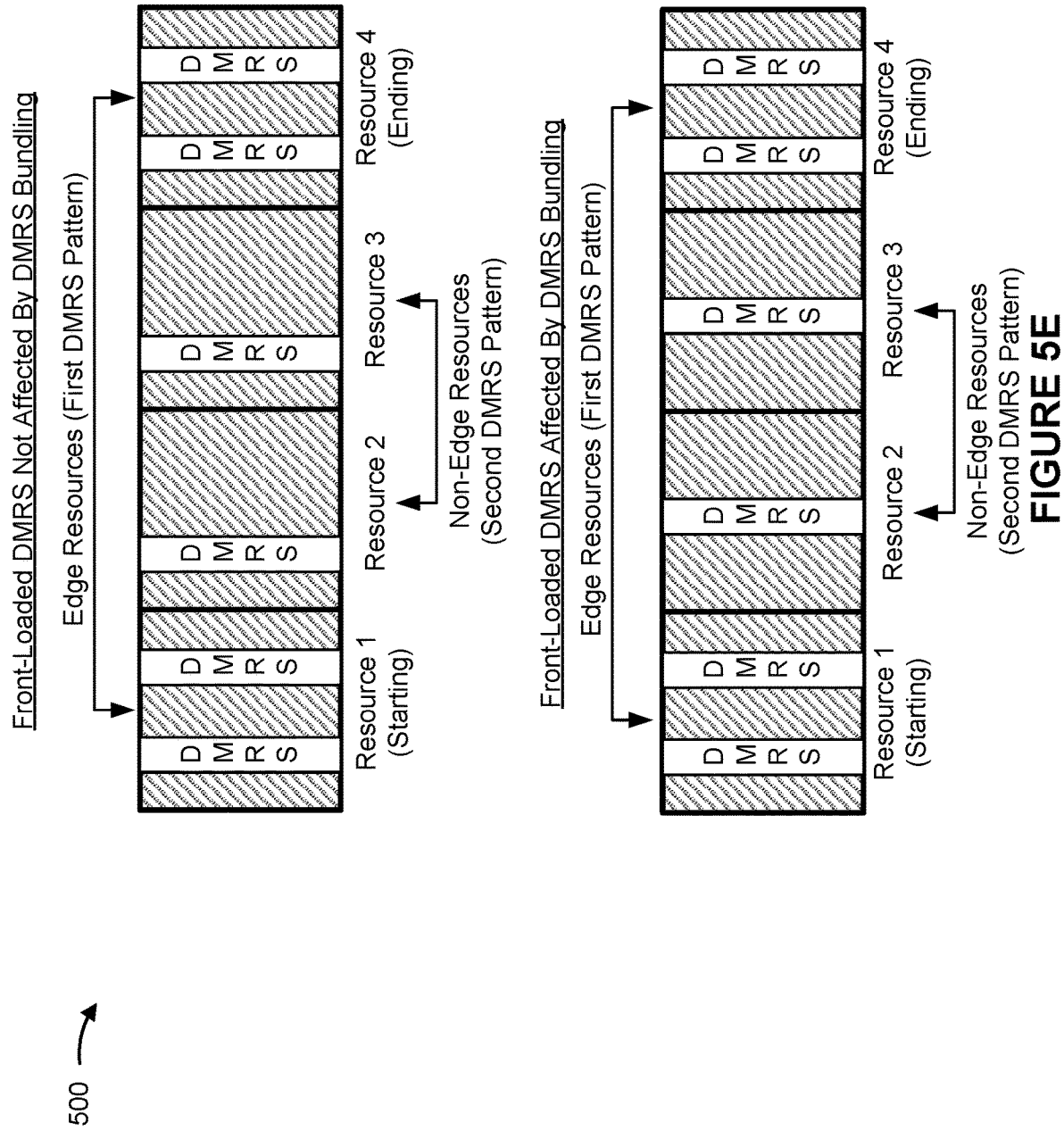

As shown in FIG. 5E, for example, if the DMRS location parameter indicates that the locations of the one or more DMRS transmissions of the second DMRS pattern are not affected by DMRS bundling, the front-loaded DMRS transmissions in the non-edge slots may be located in the same time-domain location (for example, the same symbol) as the front-loaded DMRS transmissions in the edge slots. As further shown in FIG. 5E, as another example, if the DMRS location parameter indicates that the locations of the one or more DMRS transmissions of the second DMRS pattern are affected by DMRS bundling, the DMRS location parameter may indicate that the front-loaded DMRS transmissions in the non-edge slots may be located in different time-domain locations (for example, different symbols) relative to the front-loaded DMRS transmissions in the edge slots. In such examples, the DMRS location parameter may indicate that the front-loaded DMRS transmissions in the non-edge slots may be located closer to the centers of the non-edge edge resources or closer to the centers of resource allocations for the non-edge resources relative to the front-loaded DMRS transmissions in the edge resources.

Figure 5F:
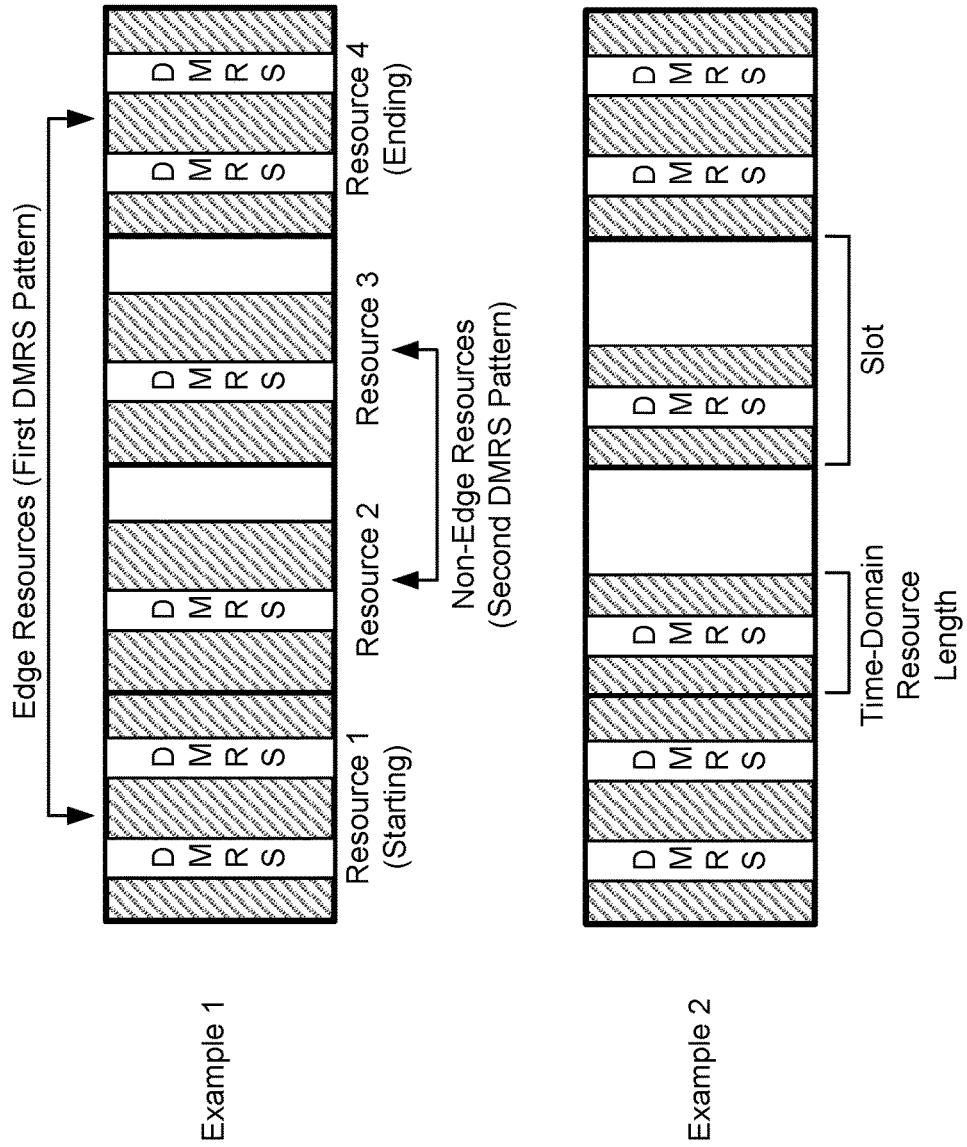

FIG. 5F illustrates various examples of front-loaded DMRS transmissions in non-edge slots being located at or near the centers of the resource allocations for the non-edge resources. As shown in Example 1 and Example 2 in FIG. 5F, the time-domain resource length of the resource allocation for the non-edge resources may not fully span the length of the non-edge resources. This may occur, for example, where the resource allocation includes a subset of symbols included in a non-edge slot. In such examples, and as shown in Example 1 and Example 2 in FIG. 5F, the front-loaded DMRS transmissions in the non-edge resources may be shifted, relative to the front-loaded DMRS transmissions in the edge resources, such that the DMRS transmissions in the non-edge resources are located at or near the centers of the resource allocations for the non-edge resources.

In some aspects, the one or more parameters associated with the second DMRS pattern may include a DMRS quantity parameter that indicates or specifies a quantity of DMRS transmissions for each non-edge resource. In some aspects, the DMRS quantity parameter may explicitly indicate the quantity of DMRS transmissions for each non-edge resource. For example, the DMRS quantity parameter may indicate that one DMRS transmission is to be included in each non-edge resource, may indicate that two DMRS transmissions are to be included in each non-edge resource, among other possibilities/examples. In some aspects, the DMRS quantity parameter may implicitly indicate the quantity of DMRS transmissions for each non-edge resource. In such examples, the DMRS quantity parameter may indicate or specify an offset value between a maximum quantity of DMRS transmissions per time-domain resource length for the first DMRS pattern and a maximum quantity of DMRS transmissions per time-domain resource length for the second DMRS pattern.

FIG. 5G illustrates an example configuration for determining the quantity and location of DMRS transmissions for each non-edge resource based at least in part on an offset value. In some aspects, the offset value may be indicated in reference to an AdditionalPosition value, which may correspond to the maximum quantity of DMRS transmissions per time-domain resource length for the first DMRS pattern. In such examples the receiver may determine the quantity and location of DMRS transmissions for each non-edge resource based at least in part on subtracting the offset value from the AdditionalPosition value for the first DMRS pattern to obtain an AdditionalPosition value for the second DMRS pattern. The receiver may determine to use the quantity and location of DMRS transmissions, associated with the combination of the AdditionalPosition value for the second DMRS pattern and the time-domain resource length of the non-edge resources, for each non-edge resource.

As an example, if the AdditionalPosition value for the first DMRS pattern is 3 and the offset value specified by the DMRS quantity parameter is 2, the receiver may determine the AdditionalPosition value for the second DMRS pattern as 1. Moreover, if the time-domain resource length for a non-edge resource is 8 symbols, the transmitter may identify the quantity and locations of DMRS transmissions for the non-edge resources as the quantity and locations of DMRS transmissions corresponding to the combination of an AdditionalPosition value of 1 and a time-domain resource length of 8 symbols. Accordingly, from the example illustrated above, in some cases the DMRS pattern for a non-edge resource, included in a plurality of time-domain resources that are associated for purposes of DMRS bundling, may be the same DMRS pattern for the non-edge resource in cases where the non-edge resource is not bundled with other time-domain resources for purposes of DMRS bundling. This may occur, for example, where a combination of an AdditionalPosition value and a time-domain resource length, for a non-edge resource that is associated with other time-domain resources for purposes of DMRS bundling, is associated with the same DMRS pattern (for example, a third DMRS pattern) as a combination of an AdditionalPosition value and a time-domain resource length for the non-edge resource in cases where the non-edge resource is not bundled with other time-domain resources for purposes of DMRS bundling.

Figure 5H:
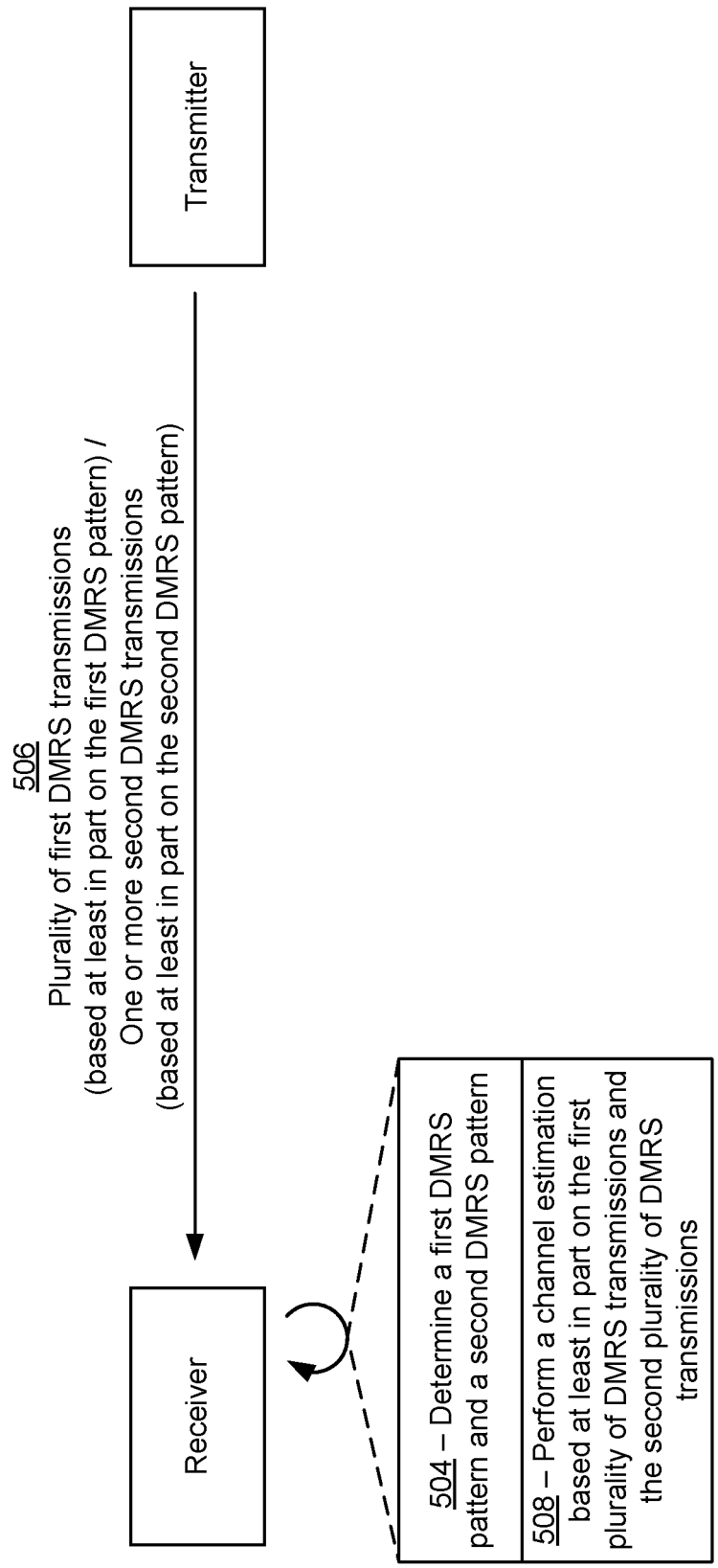

As shown in FIG. 5H, in a second operation 504, the receiver may receive the indication of DMRS bundling and the indication of the DMRS bundling configuration from the transmitter and may determine a first DMRS pattern and a second DMRS pattern for the plurality of time-domain resources based at least in part on the indication of DMRS bundling and the DMRS bundling configuration. For example, the receiver may determine, based at least in part on the indication of DMRS bundling and the one or more DMRS bundling parameters included in the DMRS bundling configuration, the first DMRS pattern for the edge resources of the plurality of time-domain resources and the second DMRS pattern for the non-edge resources of the plurality of time-domain resources.

As an example, the receiver may identify the edge resources based at least in part on the edge resource parameter included in the one or more DMRS bundling parameters, and may identify the non-edge resources based at least in part on the non-edge resource parameter included in the one or more DMRS bundling parameters. As an example, the receiver may identify the first DMRS pattern and the second DMRS pattern based at least in part on the DMRS pattern parameter. As an example, the receiver may determine the quantity and locations of DMRS transmissions in the second DMRS pattern based at least in part on the one or more parameters associated with the second DMRS pattern.

As further shown in FIG. 5H, in a third operation 506, the transmitter may transmit a plurality of first DMRS transmissions and a plurality of second DMRS transmissions in the plurality of time-domain resources. For example, the transmitter may transmit the plurality of first DMRS transmissions in the edge resources of the plurality of time-domain resources, and may transmit the plurality of second DMRS transmissions in the non-edge resources of the plurality of time-domain resources. Moreover, the transmitter may transmit the plurality of first DMRS transmissions according to the first DMRS pattern, and may transmit the plurality of second DMRS transmissions according to the second DMRS pattern.

In some aspects, the transmitter may configure different patterns for respective edge resources, in which case the DMRS bundling configuration may include an indication of the different patterns. In such examples, the transmitter may transmit DMRS transmissions in each edge resource according to the DMRS pattern configured for the edge resource. Similarly, the transmitter may configure different patterns for respective non-edge resources, in which case the DMRS bundling configuration may include an indication of the different patterns. In such examples, the transmitter may transmit DMRS transmissions in each non-edge resource according to the DMRS pattern configured for the non-edge resource.

As further shown in FIG. 5H, in a fourth operation 508, the receiver may receive the first plurality of DMRS transmissions and the second plurality of DMRS transmissions, and may perform a channel estimation, of a physical channel (for example, a PUSCH, a PUCCH, a PDSCH, or a PDCCH, among other possibilities/examples), based at least in part on the first plurality of DMRS transmissions and the second plurality of DMRS transmissions. The receiver may identify or detect the plurality of first DMRS transmissions in the edge resources of the plurality of time-domain resources based at least in part on the first DMRS pattern, and may identify or detect the plurality of second DMRS transmissions in the non-edge resources of the plurality of time-domain resources based at least in part on the second DMRS pattern.

In some aspects, the receiver may receive the indication that the plurality of time-domain resources are associated for purposes of DMRS bundling in a scheduling grant for a non-edge resource of the plurality of time-domain resources. In such examples, the receiver may perform the channel estimation of the physical channel, in the non-edge resource, based at least in part on the first DMRS pattern and the second DMRS pattern. In other words, the receiver may perform the channel estimation of the physical channel, in the non-edge resource, based at least in part on one or more DMRS transmissions in one or more edge resources (for example, one or more DMRS transmissions, of the plurality of first DMRS transmissions, that are transmitted according to the first DMRS pattern) and one or more DMRS transmissions in the non-edge resource as well as other non-edge resources (for example, one or more DMRS transmissions, of the plurality of second DMRS transmissions, that are transmitted according to the second DMRS pattern).

The transmitter may perform the channel estimation by performing one or more measurements of the plurality of first DMRS transmissions and the plurality of second DMRS transmissions. The one or more measurements may include one or more RSRQ measurements, one or more RSRP measurements, one or more RSSI measurements, or one or more CQI measurements, among other possibilities/examples.

In this way, the transmitter may transmit, to the receiver, an indication that a plurality of time-domain resources are associated for purposes of DMRS bundling. In some aspects, the transmitter may further transmit an indication of a DMRS bundling configuration for the plurality of time-domain resources, or the receiver may be hard coded with the DMRS bundling configuration. In this way, the receiver may determine DMRS patterns of DMRS transmissions for the plurality of time-domain resources based at least in part on the indication that the plurality of time-domain resources are associated for purposes of DMRS bundling and the DMRS bundling configuration. This permits the receiver to identify the DMRS transmissions, to perform a channel estimation of a physical channel on which the transmitter is to transmit one or more communications, and to use the channel estimation to facilitate demodulation of the one or more communications.

Figure 6:
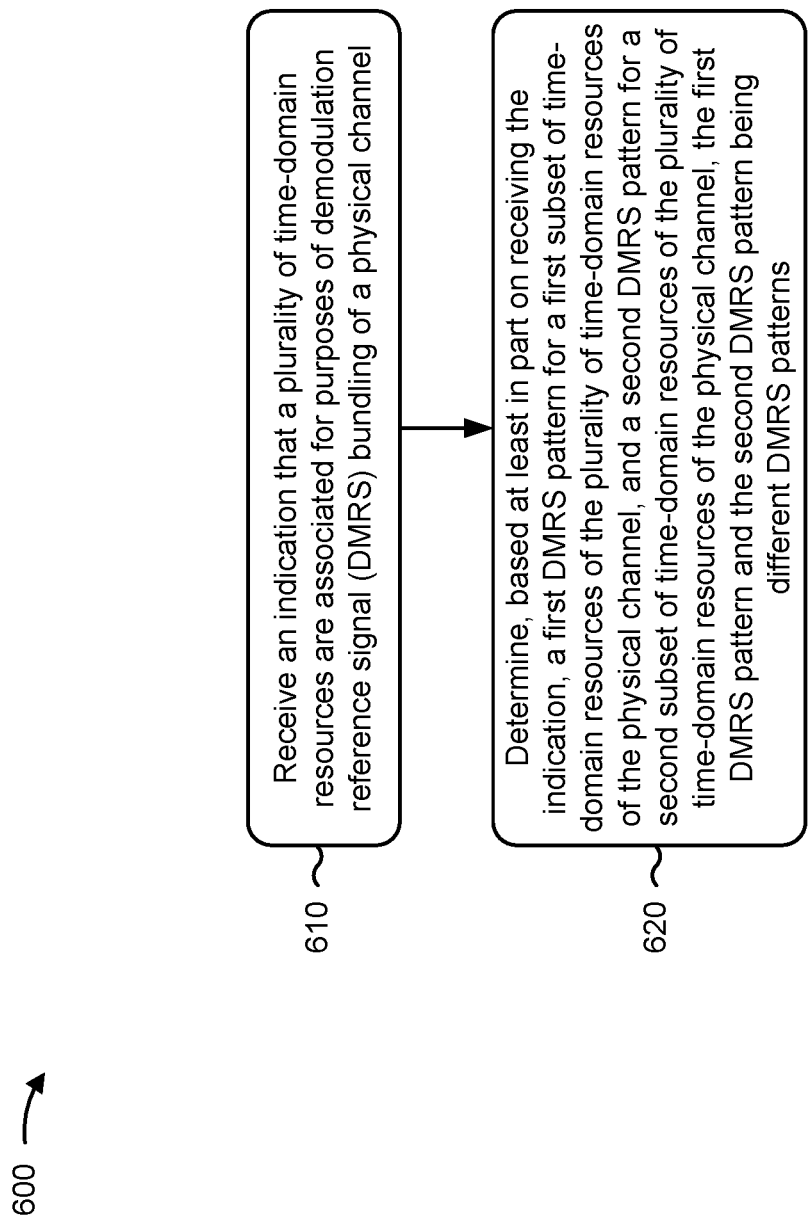
FIG. 6 is a diagram illustrating an example process for DMRS bundling, performed by a receiver, in accordance with various aspects of the present disclosure.

FIG. 6 is a diagram illustrating an example process 600 for DMRS bundling, performed by a receiver, in accordance with various aspects of the present disclosure. Example process 600 is an example where a receiver, such as a BS 110 or a UE 120, performs operations associated with DMRS bundling.

As shown in FIG. 6, in some aspects, process 600 may include receiving an indication that a plurality of time-domain resources are associated for purposes of DMRS bundling of a physical channel (block 610). For example, the receiver (using receive processor 238, controller/processor 240, memory 242, receive processor 258, controller/processor 280, memory 282, among other possibilities/examples) may receive an indication that a plurality of time-domain resources are associated for purposes of DMRS bundling of a physical channel, as described above.

As further shown in FIG. 6, in some aspects, process 600 may include determining, based at least in part on receiving the indication, a first DMRS pattern for a first subset of time-domain resources of the plurality of time-domain resources of the physical channel, and a second DMRS pattern for a second subset of time-domain resources of the plurality of time-domain resources of the physical channel, the first DMRS pattern and the second DMRS pattern being different DMRS patterns (block 620). For example, the receiver (using receive processor 238, controller/processor 240, memory 242, receive processor 258, controller/processor 280, memory 282, among other possibilities/examples) may determine, based at least in part on receiving the indication, a first DMRS pattern for a first subset of time-domain resources of the plurality of time-domain resources of the physical channel, and a second DMRS pattern for a second subset of time-domain resources of the plurality of time-domain resources of the physical channel, the first DMRS pattern and the second DMRS pattern being different DMRS patterns, as described above.

Process 600 may include additional aspects, such as any single aspect or any combination of aspects described below and/or in connection with one or more other processes described elsewhere herein.

In a first additional aspect, process 600 further comprises performing a channel estimation of the physical channel based at least in part on the first DMRS pattern and the second DMRS pattern. In a second additional aspect, alone or in combination with the first aspect, the first subset of time-domain resources comprises edge resources of the plurality of time-domain resources, and the second subset of time-domain resources comprises one or more non-edge resources of the plurality of time-domain resources. In a third additional aspect, alone or in combination with one or more of the first and second aspects, the indication that the plurality of time-domain resources are associated for purposes of DMRS bundling comprises an explicit indication that the plurality of time-domain resources are associated for purposes of DMRS bundling. In a fourth additional aspect, alone or in combination with one or more of the first through third aspects, the indication that the plurality of time-domain resources are associated for purposes of DMRS bundling comprises an implicit indication that the plurality of time-domain resources are associated for purposes of DMRS bundling.

In a fifth additional aspect, alone or in combination with one or more of the first through fourth aspects, the implicit indication comprises an indication that the plurality of time-domain resources are associated with a same scheduling grant. In a sixth additional aspect, alone or in combination with one or more of the first through fifth aspects, the implicit indication comprises an indication that the plurality of time-domain resources are associated with a same frequency-domain allocation. In a seventh additional aspect, alone or in combination with one or more of the first through sixth aspects, the implicit indication comprises an indication that the plurality of time-domain resources are associated with a same time-domain resource allocation length. In an eighth additional aspect, alone or in combination with one or more of the first through seventh aspects, the implicit indication comprises an indication that the same time-domain resource allocation length corresponds to a full slot.

In a ninth additional aspect, alone or in combination with one or more of the first through eighth aspects, the implicit indication comprises an indication that the plurality of time-domain resources are associated with a same physical channel mapping type. In a tenth additional aspect, alone or in combination with one or more of the first through ninth aspects, the implicit indication comprises an indication that the same physical channel mapping type comprises PDSCH Type A, PDSCH Type B, PUSCH Type A, or PUSCH Type B. In an eleventh additional aspect, alone or in combination with one or more of the first through tenth aspects, determining the first DMRS pattern and the second DMRS pattern comprises determining the first DMRS pattern and the second DMRS pattern based at least in part on the one or more DMRS bundling parameters. In a twelfth additional aspect, alone or in combination with one or more of the first through eleventh aspects, the one or more DMRS bundling parameters include a DMRS bundling parameter that indicates that the second DMRS pattern includes fewer DMRS transmissions per time-domain resource length relative to the first DMRS pattern.

In a thirteenth additional aspect, alone or in combination with one or more of the first through twelfth aspects, the DMRS bundling parameter specifies an offset value between a maximum quantity of DMRS transmissions per time-domain resource length for the first DMRS pattern and a maximum quantity of DMRS transmissions per time-domain resource length for the second DMRS pattern. In a fourteenth additional aspect, alone or in combination with one or more of the first through thirteenth aspects, the one or more DMRS bundling parameters include a DMRS bundling parameter that indicates that a front-loaded DMRS transmission included in the second DMRS pattern is located in a first symbol that is different from a second symbol in which a front-loaded DMRS transmission included in the first DMRS pattern is located.

In a fifteenth additional aspect, alone or in combination with one or more of the first through fourteenth aspects, the DMRS bundling parameter specifies that the first symbol is located closer to respective centers of the second subset of time-domain resources relative to a location of the second symbol in the first subset of time-domain resources. In a sixteenth additional aspect, alone or in combination with one or more of the first through fifteenth aspects, the DMRS bundling parameter specifies that the first symbol is located closer to respective centers of respective resource allocations for the second subset of time-domain resources relative to a location of the second symbol in a resource allocation of the first subset of time-domain resources. In a seventeenth additional aspect, alone or in combination with one or more of the first through sixteenth aspects, the one or more DMRS bundling parameters include a DMRS bundling parameter that specifies that the first subset of time-domain resources comprises edge resources of the plurality of time-domain resources and the second subset of time-domain resources comprises one or more non-edge resources of the plurality of time-domain resources.

In an eighteenth additional aspect, alone or in combination with one or more of the first through seventeenth aspects, a quantity of the edge resources is based at least in part on a quantity of the plurality of time-domain resources. In a nineteenth additional aspect, alone or in combination with one or more of the first through eighteenth aspects, the one or more DMRS bundling parameters include a DMRS bundling parameter that specifies that the first subset of time-domain resources comprises edge resources of the plurality of time-domain resources and the second subset of time-domain resources comprises a plurality of sets of non-edge resources, of the plurality of time-domain resources. In a twentieth additional aspect, alone or in combination with one or more of the first through nineteenth aspects, the one or more DMRS bundling parameters include a DMRS bundling parameter that specifies a quantity of non-edge resources, included in each of the plurality of sets of non-edge resources. In a twenty-first additional aspect, alone or in combination with one or more of the first through twentieth aspects, the one or more DMRS bundling parameters include a DMRS bundling parameter that specifies respective time-domain locations for a starting edge resource and an ending edge resource of the plurality of time-domain resources.

In a twenty-second additional aspect, alone or in combination with one or more of the first through twenty-first aspects, receiving the indication that the plurality of time-domain resources are associated for purposes of DMRS bundling comprises receiving the indication in at least one of an RRC communication or a MAC-CE communication. In a twenty-third additional aspect, alone or in combination with one or more of the first through twenty-second aspects, receiving the indication that the plurality of time-domain resources are associated for purposes of DMRS bundling comprises receiving the indication that the plurality of time-domain resources are associated for purposes of DMRS bundling based at least in part on transmitting an indication of a capability of the receiver to support DMRS bundling. In a twenty-fourth additional aspect, alone or in combination with one or more of the first through twenty-third aspects, receiving the indication that the plurality of time-domain resources are associated for purposes of DMRS bundling comprises receiving the indication in a scheduling grant for a non-edge resource of the second subset of time-domain resources.

In a twenty-fifth additional aspect, alone or in combination with one or more of the first through twenty-fourth aspects, process 600 further comprises performing a channel estimation of the physical channel, in the non-edge resource, based at least in part on the first DMRS pattern and the second DMRS pattern. In a twenty-sixth additional aspect, alone or in combination with one or more of the first through twenty-fifth aspects, the plurality of time-domain resources comprises at least one of a plurality of slots or a plurality of mini-slots, a plurality of TTIs, a plurality of OFDM symbols, or a plurality of time-domain scheduling allocations. In a twenty-seventh additional aspect, alone or in combination with one or more of the first through twenty-sixth aspects, the second DMRS pattern is a same DMRS pattern as a third DMRS pattern for the second subset of time-domain resources when the plurality of time-domain resources are not associated for purposes of DMRS bundling for the physical channel.

Figure 7:
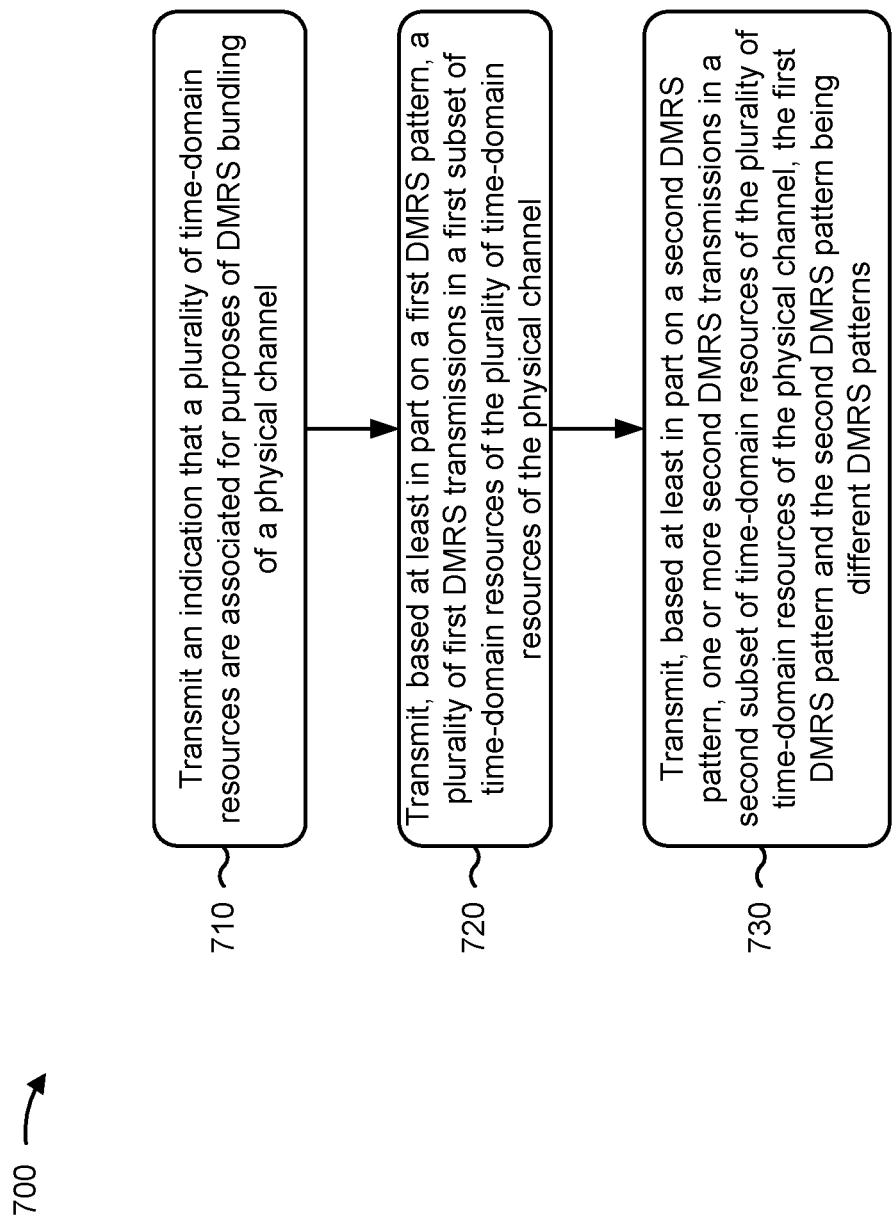
FIG. 7 is a diagram illustrating an example process for DMRS bundling, performed by a transmitter, in accordance with various aspects of the present disclosure.

FIG. 7 is a diagram illustrating an example process 700 for DMRS bundling, performed by a transmitter, in accordance with various aspects of the present disclosure. Example process 700 is an example where a transmitter, such as a BS 110 or a UE 120, performs operations associated with DMRS bundling.

As shown in FIG. 7, in some aspects, process 700 may include transmitting an indication that a plurality of time-domain resources are associated for purposes of DMRS bundling of a physical channel (block 710). For example, the transmitter (using transmit processor 220, controller/processor 240, memory 242, transmit processor 264, controller/processor 280, memory 282, among other possibilities/examples) may transmit an indication that a plurality of time-domain resources are associated for purposes of DMRS bundling of a physical channel, as described above.

As further shown in FIG. 7, in some aspects, process 700 may include transmitting, based at least in part on a first DMRS pattern, a plurality of first DMRS transmissions in a first subset of time-domain resources of the plurality of time-domain resources of the physical channel (block 720). For example, the transmitter (using transmit processor 220, controller/processor 240, memory 242, transmit processor 264, controller/processor 280, memory 282, among other possibilities/examples) may transmit, based at least in part on a first DMRS pattern, a plurality of first DMRS transmissions in a first subset of time-domain resources of the plurality of time-domain resources of the physical channel, as described above.

As further shown in FIG. 7, in some aspects, process 700 may include transmitting, based at least in part on a second DMRS pattern, one or more second DMRS transmissions in a second subset of time-domain resources of the plurality of time-domain resources of the physical channel, the first DMRS pattern and the second DMRS pattern being different DMRS patterns (block 730). For example, the transmitter (using transmit processor 220, controller/processor 240, memory 242, transmit processor 264, controller/processor 280, memory 282, among other possibilities/examples) may transmit, based at least in part on a second DMRS pattern, one or more second DMRS transmissions in a second subset of time-domain resources of the plurality of time-domain resources of the physical channel, the first DMRS pattern and the second DMRS pattern being different DMRS patterns, as described above.

Process 700 may include additional aspects, such as any single aspect or any combination of aspects described below and/or in connection with one or more other processes described elsewhere herein.

In a first additional aspect, the first subset of time-domain resources comprises edge resources of the plurality of time-domain resources, and the second subset of time-domain resources comprises one or more non-edge resources of the plurality of time-domain resources. In a second additional aspect, alone or in combination with the first aspect, transmitting the indication that the plurality of time-domain resources are associated for purposes of DMRS bundling comprises transmitting an explicit indication that the plurality of time-domain resources are associated for purposes of DMRS bundling. In a third additional aspect, alone or in combination with one or more of the first and second aspects, transmitting the indication that the plurality of time-domain resources are associated for purposes of DMRS bundling comprises transmitting an implicit indication that the plurality of time-domain resources are associated for purposes of DMRS bundling. In a fourth additional aspect, alone or in combination with one or more of the first through third aspects, the implicit indication comprises an indication that the plurality of time-domain resources are associated with a same scheduling grant.

In a fifth additional aspect, alone or in combination with one or more of the first through fourth aspects, the implicit indication comprises an indication that the plurality of time-domain resources are associated with a same frequency-domain allocation. In a sixth additional aspect, alone or in combination with one or more of the first through fifth aspects, the implicit indication comprises an indication that the plurality of time-domain resources are associated with a same time-domain resource allocation length. In a seventh additional aspect, alone or in combination with one or more of the first through sixth aspects, the implicit indication comprises an indication that the same time-domain resource allocation length corresponds to a full slot. In an eighth additional aspect, alone or in combination with one or more of the first through seventh aspects, the implicit indication comprises an indication that the plurality of time-domain resources are associated with a same physical channel mapping type. In a ninth additional aspect, alone or in combination with one or more of the first through eighth aspects, the implicit indication comprises an indication that the same physical channel mapping type comprises PDSCH Type A, PDSCH Type B, PUSCH Type A, or PUSCH Type B.

In a tenth additional aspect, alone or in combination with one or more of the first through ninth aspects, process 700 further comprises transmitting an indication of one or more DMRS bundling parameters. In an eleventh additional aspect, alone or in combination with one or more of the first through tenth aspects, the one or more DMRS bundling parameters include a DMRS bundling parameter that indicates that the second DMRS pattern includes fewer DMRS transmissions per time-domain resource length relative to the first DMRS pattern. In a twelfth additional aspect, alone or in combination with one or more of the first through eleventh aspects, the DMRS bundling parameter specifies an offset value between a maximum quantity of DMRS transmissions per time-domain resource length for the first DMRS pattern and a maximum quantity of DMRS transmissions per time-domain resource length for the second DMRS pattern. In a thirteenth additional aspect, alone or in combination with one or more of the first through twelfth aspects, the one or more DMRS bundling parameters include a DMRS bundling parameter that indicates that a front-loaded DMRS transmission included in the second DMRS pattern is located in a first symbol that is different from a second symbol in which a front-loaded DMRS transmission included in the first DMRS pattern is located.

In a fourteenth additional aspect, alone or in combination with one or more of the first through thirteenth aspects, the DMRS bundling parameter specifies that the first symbol is located closer to respective centers of the second subset of time-domain resources, relative to a location of the second symbol in the first subset of time-domain resources. In a fifteenth additional aspect, alone or in combination with one or more of the first through fourteenth aspects, the DMRS bundling parameter specifies that the first symbol is located closer to respective centers of respective resource allocations for the second subset of time-domain resources, relative to a location of the second symbol in a resource allocation of the first subset of time-domain resources. In a sixteenth additional aspect, alone or in combination with one or more of the first through fifteenth aspects, the one or more DMRS bundling parameters include a DMRS bundling parameter that specifies that the first subset of time-domain resources comprises edge resources of the plurality of time-domain resources, and the second subset of time-domain resources comprises one or more non-edge resources of the plurality of time-domain resources.

In a seventeenth additional aspect, alone or in combination with one or more of the first through sixteenth aspects, a quantity of the edge resources is based at least in part on a quantity of the plurality of time-domain resources. In an eighteenth additional aspect, alone or in combination with one or more of the first through seventeenth aspects, the one or more DMRS bundling parameters include a DMRS bundling parameter that specifies that the first subset of time-domain resources comprises edge resources of the plurality of time-domain resources, and the second subset of time-domain resources comprises a plurality of sets of non-edge resources, of the plurality of time-domain resources. In a nineteenth additional aspect, alone or in combination with one or more of the first through eighteenth aspects, the one or more DMRS bundling parameters include a DMRS bundling parameter that specifies a quantity of non-edge resources included in each of the plurality of sets of non-edge resources. In a twentieth additional aspect, alone or in combination with one or more of the first through nineteenth aspects, the one or more DMRS bundling parameters include a DMRS bundling parameter that specifies respective time-domain locations for a starting edge resource and an ending edge resource of the plurality of time-domain resources.

In a twenty-first additional aspect, alone or in combination with one or more of the first through twentieth aspects, transmitting the indication that the plurality of time-domain resources are associated for purposes of DMRS bundling comprises transmitting the indication in at least one of an RRC communication or a MAC-CE communication. In a twenty-second additional aspect, alone or in combination with one or more of the first through twenty-first aspects, transmitting the indication that the plurality of time-domain resources are associated for purposes of DMRS bundling comprises transmitting the indication that the plurality of time-domain resources are associated for purposes of DMRS bundling based at least in part on receiving an indication of a capability of a receiver to support DMRS bundling.

In a twenty-third additional aspect, alone or in combination with one or more of the first through twenty-second aspects, transmitting the indication that the plurality of time-domain resources are associated for purposes of DMRS bundling comprises transmitting the indication in a scheduling grant for a non-edge resource of the second subset of time-domain resources. In a twenty-fourth additional aspect, alone or in combination with one or more of the first through twenty-third aspects, the plurality of time-domain resources comprises at least one of: a plurality of slots or a plurality of mini-slots, a plurality of TTIs, a plurality of OFDM symbols, or a plurality of time-domain scheduling allocations. In a twenty-fifth additional aspect, alone or in combination with one or more of the first through twenty-fourth aspects, the second DMRS pattern is a same DMRS pattern as a third DMRS pattern for the second subset of time-domain resources when the plurality of time-domain resources are not associated for purposes of DMRS bundling for the physical channel.

Figure 8:
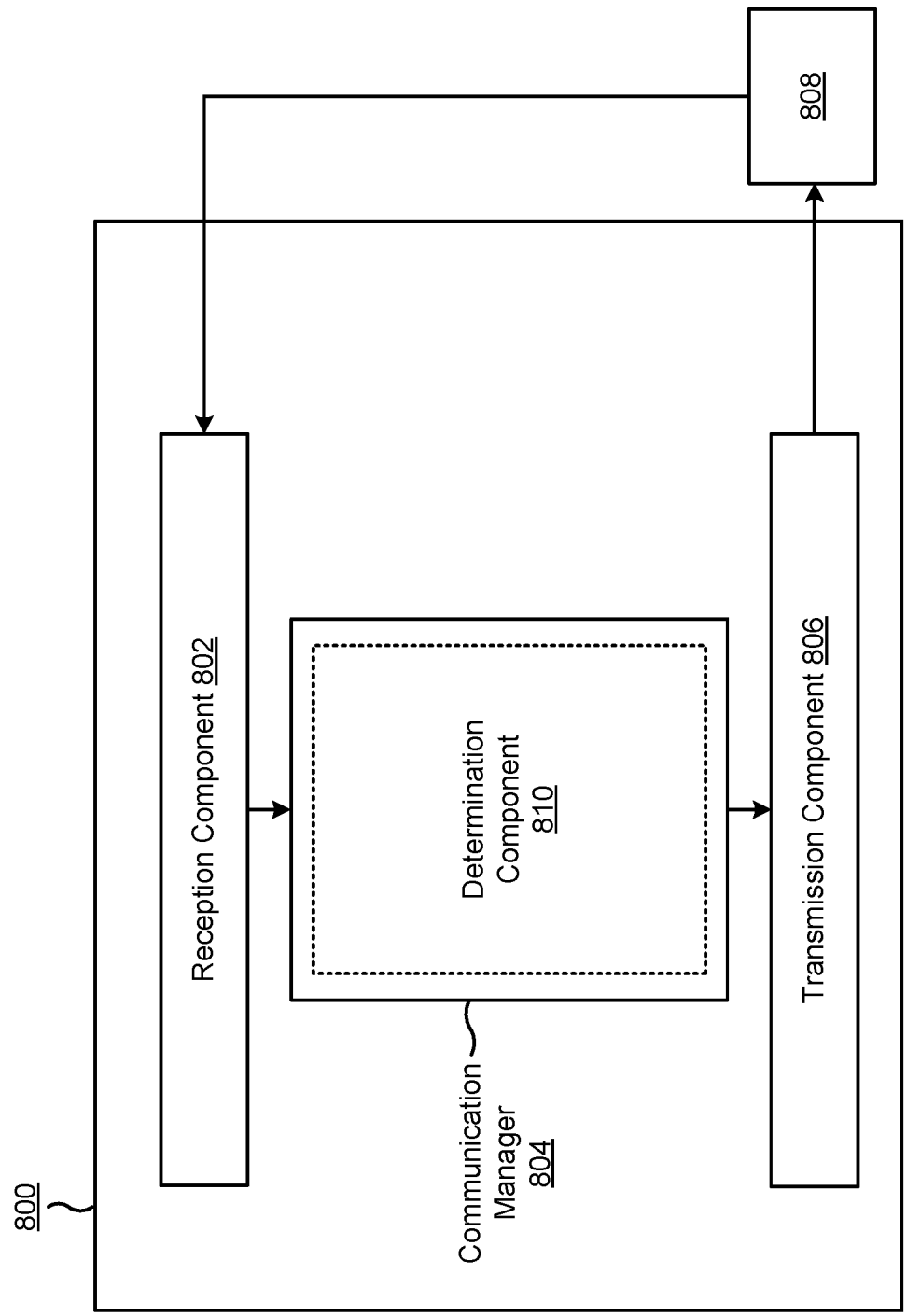
FIGS. 8 and 9 are block diagrams of example apparatuses for wireless communication in accordance with various aspects of the present disclosure.

FIG. 8 is a block diagram of an example apparatus 800 for wireless communication. The apparatus 800 may be a receiver such as a UE 120 or a BS 110, or a receiver may include the apparatus 800. In some aspects, the apparatus 800 includes a reception component 802, a communication manager 804, and a transmission component 806, which may be in communication with one another (for example, via one or more buses). As shown, the apparatus 800 may communicate with another apparatus 808 (such as a UE 120, a BS 110, or another wireless communication device) using the reception component 802 and the transmission component 806.

In some aspects, the apparatus 800 may be configured to perform one or more operations described herein in connection with FIGS. 5A-5H. Additionally or alternatively, the apparatus 800 may be configured to perform one or more processes described herein, such as process 600 of FIG. 6. In some aspects, the apparatus 800 may include one or more components of the receiver described above in connection with FIG. 2.

The reception component 802 may receive communications, such as reference signals, control information, data communications, or a combination thereof, from the apparatus 808. The reception component 802 may provide received communications to one or more other components of the apparatus 800, such as the communication manager 804. In some aspects, the reception component 802 may perform signal processing on the received communications (such as filtering, amplification, demodulation, analog-todigital conversion, demultiplexing, deinterleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the receiver described above in connection with FIG. 2.

The transmission component 806 may transmit communications, such as reference signals, control information, data communications, or a combination thereof, to the apparatus 808. In some aspects, the communication manager 804 may generate communications and may transmit the generated communications to the transmission component 806 for transmission to the apparatus 808. In some aspects, the transmission component 806 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 806 may include one or more antennas, a modulator, a transmit MIMO processor, a transmit processor, a controller/processor, a memory, or a combination thereof, of the receiver described above in connection with FIG. 2. In some aspects, the transmission component 806 may be co-located with the reception component 802 in a transceiver.

The communication manager 804 may receive (or may cause reception component 802 to receive), from apparatus 808, an indication that a plurality of time-domain resources are associated for purposes of DMRS bundling of a physical channel. In some aspects, the indication may be an explicit indication or an implicit indication. The communication manager 804 may determine, based at least in part on receiving the indication, a first DMRS pattern for a first subset of time-domain resources of the plurality of time-domain resources of the physical channel, and a second DMRS pattern for a second subset of time-domain resources of the plurality of time-domain resources of the physical channel, the first DMRS pattern and the second DMRS pattern being different DMRS patterns. In some aspects, the communication manager 804 may receive (or may cause reception component 802 to receive), from apparatus 808, an indication of one or more DMRS bundling parameters and determine the first DMRS pattern and the second DMRS pattern based at least in part on the one or more DMRS bundling parameters. In some aspects, the communication manager 804 may include a controller/processor, a memory, a scheduler, a communication unit, or a combination thereof, of the receiver described above in connection with FIG. 2.

In some aspects, the communication manager 804 may include a one or more components such as a determination component 810. Alternatively, the one or more components may be separate and distinct from the communication manager 804. In some aspects, the one or more components may include or may be implemented within a controller/processor, a memory, a scheduler, a communication unit, or a combination thereof, of the receiver described above in connection with FIG. 2. Additionally or alternatively, the one or more components may be implemented at least in part as software stored in a memory. For example, a component (or a portion of a component) may be implemented as instructions or code stored in a non-transitory computer-readable medium and executable by a controller or a processor to perform the functions or operations of the component.

The determination component 810 may determine, based at least in part on reception component 802 receiving an indication that a plurality of time-domain resources are associated for purposes of DMRS bundling of a physical channel, a first DMRS pattern for a first subset of time-domain resources of the plurality of time-domain resources of the physical channel, and a second DMRS pattern for a second subset of time-domain resources of the plurality of time-domain resources of the physical channel, the first DMRS pattern and the second DMRS pattern being different DMRS patterns. In some aspects, the determination component 810 may determine the first DMRS pattern and the second DMRS pattern based at least in part on the one or more DMRS bundling parameters.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
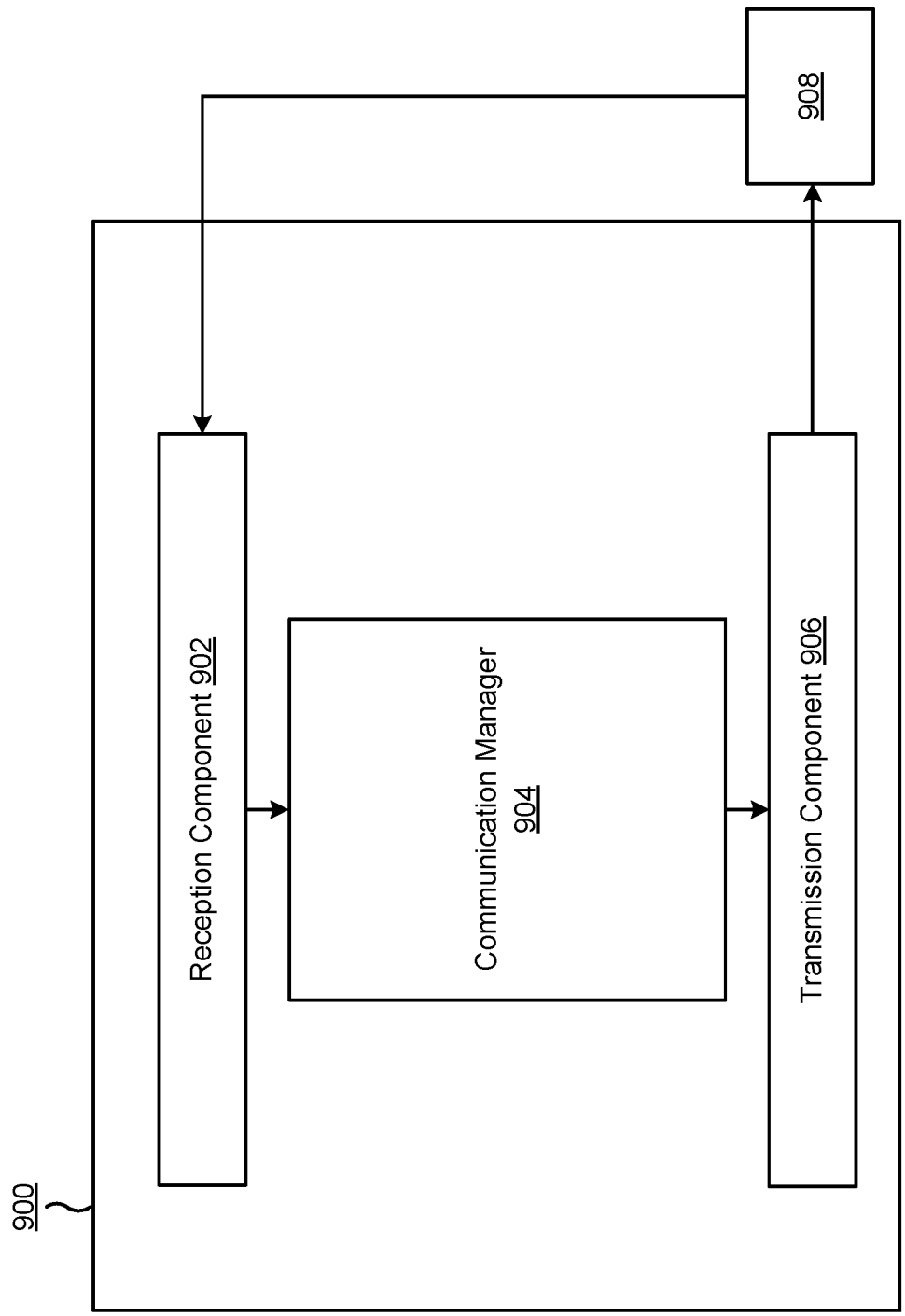

FIG. 9 is a block diagram of an example apparatus 900 for wireless communication. The apparatus 900 may be a transmitter such as a UE 120 or a BS 110, or a transmitter may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE 120, a BS 110, or another wireless communication device) using the reception component 902 and the transmission component 906.

In some aspects, the apparatus 900 may be configured to perform one or more operations described herein in connection with FIGS. 5A-5H. Additionally or alternatively, the apparatus 900 may be configured to perform one or more processes described herein, such as process 700 of FIG. 7. In some aspects, the apparatus 900 may include one or more components of the transmitter described above in connection with FIG. 2.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the transmitter described above in connection with FIG. 2.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the transmitter described above in connection with FIG. 2. In some aspects, the transmission component 906 may be co-located with the reception component 902 in a transceiver.

The communication manager 904 may transmit (or may cause transmission component 906 to transmit), to apparatus 908, an indication that a plurality of time-domain resources are associated for purposes of DMRS bundling of a physical channel. In some aspects, the indication includes an explicit indication or an implicit indication. In some aspects, the communication manager 904 may transmit (or may cause transmission component 906 to transmit) the indication based at least in part on communication manager 904 receiving (or causing reception component 902 to receive), from the apparatus 908, an indication of a capability of the apparatus 908 to support DMRS bundling. The communication manager 904 may transmit (or may cause transmission component 906 to transmit), to apparatus 908 and based at least in part on a first DMRS pattern, a plurality of first DMRS transmissions in a first subset of time-domain resources of the plurality of time-domain resources of the physical channel. The communication manager 904 may transmit (or may cause transmission component 906 to transmit), to apparatus 908 and based at least in part on a second DMRS pattern, one or more second DMRS transmissions in a second subset of time-domain resources of the plurality of time-domain resources of the physical channel, the first DMRS pattern and the second DMRS pattern being different DMRS patterns. In some aspects, the communication manager 904 may transmit (or may cause transmission component 906 to transmit) the indication in a scheduling grant for a non-edge resource of the second subset of time-domain resources. In some aspects, the communication manager 904 may transmit (or may cause transmission component 906 to transmit), to apparatus 908, an indication of one or more DMRS bundling parameters. In some aspects, the communication manager 904 may include a controller/processor, a memory, a scheduler, a communication unit, or a combination thereof, of the transmitter described above in connection with FIG. 2.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, or the like, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or the like, or combinations thereof), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a receiver, comprising:
   receiving an indication associated with a plurality of time-domain resources that are associated for purposes of demodulation reference signal (DMRS) bundling of a physical channel,
      wherein the indication includes one or more DMRS bundling parameters for a DMRS configuration associated with a first subset of the plurality of time-domain resources and a second subset of the plurality of time-domain resources, wherein at least one of the one or more DMRS bundling parameters indicates at least one of an offset value associated with DMRS transmissions per time-domain resource length or a location associated with a front-loaded DMRS transmission; and determining, based at least in part on the one or more DMRS bundling parameters, a first DMRS pattern for the first subset of time-domain resources and a second DMRS pattern for the second subset of time-domain resources, the first DMRS pattern and the second DMRS pattern being different DMRS patterns.

2. The method of claim 1, wherein the first subset of time-domain resources comprises edge resources of the plurality of time-domain resources and the second subset of time-domain resources comprises one or more non-edge resources of the plurality of time-domain resources.

3. The method of claim 1, wherein the indication comprises an explicit indication that the plurality of time-domain resources are associated for purposes of DMRS bundling.

4. The method of claim 1, wherein the indication comprises an implicit indication that the plurality of time-domain resources are associated for purposes of DMRS bundling.

5. The method of claim 4, wherein the implicit indication comprises at least one of:
an indication that the plurality of time-domain resources are associated with a same scheduling grant,
an indication that the plurality of time-domain resources are associated with a same frequency-domain allocation,
an indication that the plurality of time-domain resources are associated with a same time-domain resource allocation length,
an indication that the same time-domain resource allocation length corresponds to a full slot,
an indication that the plurality of time-domain resources are associated with a same physical channel mapping type, or
an indication that the same physical channel mapping type comprises physical downlink shared channel (PDSCH) Type A, PDSCH Type B, physical uplink shared channel (PUSCH) Type A, or PUSCH Type B.

6. The method of claim 1, wherein receiving the indication comprises receiving the indication that the plurality of time-domain resources are associated for purposes of DMRS bundling based at least in part on transmitting an indication of a capability of the receiver to support DMRS bundling.

7. The method of claim 1, wherein receiving the indication comprises receiving the indication in a scheduling grant for a non-edge resource of the second subset of time-domain resources.

8. The method of claim 1, wherein the plurality of time-domain resources comprises at least one of: a plurality of slots or a plurality of mini-slots, a plurality of transmission time-intervals (TTIs), a plurality of orthogonal frequency division multiplexing (OFDM) symbols, or a plurality of time-domain scheduling allocations.

9. The method of claim 1, wherein the second DMRS pattern is a same DMRS pattern as a third DMRS pattern for the second subset of time-domain resources when the plurality of time-domain resources are not associated for purposes of DMRS bundling for the physical channel.

10. A method of wireless communication performed by a transmitter, comprising:
transmitting an indication associated with a plurality of time-domain resources that are associated for purposes of demodulation reference signal (DMRS) bundling of a physical channel,
wherein the indication includes one or more DMRS bundling parameters for a DMRS configuration associated with a first subset of the plurality of time-domain resources and a second subset of the plurality of time-domain resources,
wherein at least one of the one or more DMRS bundling parameters indicates at least one of an offset value associated with DMRS transmissions per time-domain resource length or a location associated with a front-loaded DMRS transmission;
transmitting, based at least in part on a first DMRS pattern, a plurality of first DMRS transmissions in the first subset of time-domain resources; and
transmitting, based at least in part on a second DMRS pattern, one or more second DMRS transmissions in the second subset of time-domain resources, the first DMRS pattern and the second DMRS pattern being different DMRS patterns.

11. The method of claim 10, wherein the first subset of time-domain resources comprises edge resources of the plurality of time-domain resources and the second subset of time-domain resources comprises one or more non-edge resources of the plurality of time-domain resources.

12. The method of claim 10, wherein the one or more DMRS bundling parameters indicates the offset value associated with DMRS transmissions per time-domain resource length and a location associated with a front-loaded DMRS transmission.

13. The method of claim 12, wherein the one or more DMRS bundling parameters include a DMRS bundling parameter that indicates that the second DMRS pattern includes fewer DMRS transmissions per time-domain resource length relative to the first DMRS pattern.

14. The method of claim 10, wherein the offset value is between a maximum quantity of the DMRS transmissions per time-domain resource length for the first DMRS pattern and a maximum quantity of the DMRS transmissions per time-domain resource length for the second DMRS pattern.

15. The method of claim 12, wherein the one or more DMRS bundling parameters include a DMRS bundling parameter that indicates the front-loaded DMRS transmission is included in the second DMRS pattern and is located in a first symbol that is different from a second symbol in which a front-loaded DMRS transmission included in the first DMRS pattern is located,
wherein the front-loaded DMRS transmission is a first DMRS in a particular slot.

16. The method of claim 15, wherein the DMRS bundling parameter specifies that the first symbol is located closer to respective centers of the second subset of time-domain resources, relative to a location of the second symbol in the first subset of time-domain resources.

17. The method of claim 15, wherein the DMRS bundling parameter specifies that the first symbol is located closer to respective centers of respective resource allocations for the second subset of time-domain resources, relative to a location of the second symbol in a resource allocation of the first subset of time-domain resources.

18. The method of claim 12, wherein the one or more DMRS bundling parameters include a DMRS bundling parameter that specifies that the first subset of time-domain resources comprises edge resources of the plurality of time-domain resources and the second subset of time-domain resources comprises one or more non-edge resources of the plurality of time-domain resources.

19. The method of claim 18, wherein a quantity of the edge resources is based at least in part on a quantity of the plurality of time-domain resources.

20. The method of claim 12, wherein the one or more DMRS bundling parameters include a DMRS bundling parameter that specifies that the first subset of time-domain resources comprises edge resources of the plurality of time-domain resources and the second subset of time-domain resources comprises a plurality of sets of non-edge resources, of the plurality of time-domain resources.

21. The method of claim 20, wherein the one or more DMRS bundling parameters include a DMRS bundling parameter that specifies a quantity of non-edge resources included in each of the plurality of sets of non-edge resources.

22. The method of claim 12, wherein the one or more DMRS bundling parameters include a DMRS bundling parameter that specifies respective time-domain locations for a starting edge resource and an ending edge resource of the plurality of time-domain resources.

23. The method of claim 10, wherein transmitting the indication comprises transmitting the indication that the plurality of time-domain resources are associated for purposes of DMRS bundling based at least in part on receiving an indication of a capability of a receiver to support DMRS bundling.

24. The method of claim 10, wherein transmitting the indication comprises transmitting the indication in a scheduling grant for a non-edge resource of the second subset of time-domain resources.

25. The method of claim 10, wherein the plurality of time-domain resources comprises at least one of: a plurality of slots or a plurality of mini-slots, a plurality of transmission time-intervals (TTIs), a plurality of orthogonal frequency division multiplexing (OFDM) symbols, or a plurality of time-domain scheduling allocations.

26. The method of claim 10, wherein the second DMRS pattern is a same DMRS pattern as a third DMRS pattern for the second subset of time-domain resources when the plurality of time-domain resources are not associated for purposes of DMRS bundling for the physical channel.

27. A receiver for wireless communication, comprising:
a memory; and
one or more processors coupled to the memory, the one or more processors configured to:
receive an indication associated with a plurality of time-domain resources that are associated for purposes of demodulation reference signal (DMRS) bundling of a physical channel,
wherein the indication includes one or more DMRS bundling parameters for a DMRS configuration associated with a first subset of the plurality of time-domain resources and a second subset of the plurality of time-domain resources,
wherein at least one of the one or more DMRS bundling parameters indicates at least one of an offset value associated with DMRS transmissions per time-domain resource length or a location associated with a front-loaded DMRS transmission; and
determine, based at least in part on receiving the one or more DMRS bundling parameters, a first DMRS pattern for the first subset of time-domain resources, and a second DMRS pattern for a second subset of time-domain resources, the first DMRS pattern and the second DMRS pattern being different DMRS patterns.

28. The receiver of claim 27, wherein the one or more processors are configured to:
receive, prior to receiving the indication, an indication that the plurality of time-domain resources are associated for the purposes of DMRS bundling of the physical channel.

29. A transmitter for wireless communication, comprising:
a memory; and
one or more processors coupled to the memory, the one or more processors configured to:
transmit an indication associated with a plurality of time-domain resources that are associated for purposes of demodulation reference signal (DMRS) bundling of a physical channel,
wherein the indication includes one or more DMRS bundling parameters for a DMRS configuration associated with a first subset of the plurality of time-domain resources and a second subset of the plurality of time-domain resources,
wherein at least one of the one or more DMRS bundling parameters indicates at least one of an offset value associated with DMRS transmissions per time-domain resource length or a location associated with a front-loaded DMRS transmission;
transmit, based at least in part on a first DMRS pattern, a plurality of first DMRS transmissions in the first subset of time-domain resources; and
transmit, based at least in part on a second DMRS pattern, one or more second DMRS transmissions in the second subset of time-domain resources, the first DMRS pattern and the second DMRS pattern being different DMRS patterns.

30. The transmitter of claim 29, wherein the one or more processors are configured to:
transmit, prior to transmitting the indication, an implicit indication that the plurality of time-domain resources are associated for purposes of DMRS bundling, the implicit indication comprising at least one of:
an indication that the plurality of time-domain resources are associated with a same scheduling grant,
an indication that the plurality of time-domain resources are associated with a same frequency-domain allocation,
an indication that the plurality of time-domain resources are associated with a same time-domain resource allocation length,
an indication that the same time-domain resource allocation length corresponds to a full slot,
an indication that the plurality of time-domain resources are associated with a same physical channel mapping type, or
an indication that the same physical channel mapping type comprises physical downlink shared channel (PDSCH) Type A, PDSCH Type B, physical uplink shared channel (PUSCH) Type A, or PUSCH Type B.

* * * * *